US010717054B2

(12) United States Patent
Choi et al.

(10) Patent No.: US 10,717,054 B2
(45) Date of Patent: Jul. 21, 2020

(54) CHABAZITE ZEOLITE MEMBRANE HAVING PORE SIZE CONTROLLED BY USING CHEMICAL VAPOR DEPOSITION AND METHOD OF PREPARING THE SAME

(71) Applicant: Korea University Research and Business Foundation, Seoul (KR)

(72) Inventors: Jungkyu Choi, Seoul (KR); Eun-Joo Kim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 440 days.

(21) Appl. No.: 15/527,690

(22) PCT Filed: Nov. 16, 2015

(86) PCT No.: PCT/KR2015/012278
§ 371 (c)(1),
(2) Date: May 17, 2017

(87) PCT Pub. No.: WO2016/085177
PCT Pub. Date: Jun. 2, 2016

(65) Prior Publication Data
US 2018/0326365 A1    Nov. 15, 2018

(30) Foreign Application Priority Data

Nov. 25, 2014 (KR) .................. 10-2014-0165182

(51) Int. Cl.
*B01D 71/02* (2006.01)
*B01D 53/22* (2006.01)
(Continued)

(52) U.S. Cl.
CPC ......... *B01D 71/028* (2013.01); *B01D 53/228* (2013.01); *B01D 67/0051* (2013.01);
(Continued)

(58) Field of Classification Search
CPC .............. B01D 53/228; B01D 67/0051; B01D 67/0072; B01D 67/0076; B01D 69/02;
(Continued)

(56) References Cited

U.S. PATENT DOCUMENTS 5,672,388 A * 9/1997 McHenry ........... B01D 67/0072
427/248.1
6,043,177 A * 3/2000 Falconer .............. B01D 71/028
423/111
(Continued)

FOREIGN PATENT DOCUMENTS

JP       2005-254161 A    9/2005
JP       2008-246295 A    10/2008
(Continued)

OTHER PUBLICATIONS

Kim, Eunjoo et al., "Uniform Si-CHA Zeolite Layers Formed by a Selective Sonication-Assisted Deposition Method", Angew. Chem., Int. Ed., 52, Apr. 2013, pp. 5280-5284. (Year: 2013).*
(Continued)

*Primary Examiner* — Jason M Greene
(74) *Attorney, Agent, or Firm* — Hultquist, PLLC; Steven J. Hultquist

(57) ABSTRACT

The present invention relates to a chabazite zeolite membrane with a controlled pore size and a production method thereof, wherein the sizes of pore space and pore mouth of the chabazite zeolite membrane are finely controlled through chemical vapor deposition. Through the chemical vapor deposition, defects present in the chabazite zeolite membrane are eliminated, and the pore size is effectively controlled. Thus, unlike hydrophilic membranes showing excellent $CO_2/N_2$ separation performance under a dry condition, the chabazite zeolite membrane with a controlled pore size according to the present invention has a hydrophobic surface, and thus can maintain excellent $CO_2/N_2$ separation (Continued)

performance even under a wet condition. Accordingly, the chabazite zeolite membrane of the present invention can effectively capture carbon dioxide from nitrogen under various environmental conditions.

16 Claims, 13 Drawing Sheets

(51) Int. Cl.

| | | |
|---|---|---|
| *B01D 67/00* | (2006.01) | |
| *B01D 69/10* | (2006.01) | |
| *B01D 69/02* | (2006.01) | |
| *B01J 29/70* | (2006.01) | |
| *B01J 35/06* | (2006.01) | |

(52) U.S. Cl.
CPC ..... *B01D 67/0072* (2013.01); *B01D 67/0076* (2013.01); *B01D 67/0093* (2013.01); *B01D 69/02* (2013.01); *B01D 69/10* (2013.01); *B01D 2253/108* (2013.01); *B01D 2253/25* (2013.01); *B01D 2257/504* (2013.01); *B01D 2323/08* (2013.01); *B01D 2325/02* (2013.01); *B01J 29/7015* (2013.01); *B01J 35/065* (2013.01); *Y02C 10/10* (2013.01)

(58) Field of Classification Search
CPC .................. B01D 69/10; B01D 71/028; B01D 2253/108; B01D 2257/504; B01J 29/7015; B01J 35/065
See application file for complete search history.

(56) References Cited

U.S. PATENT DOCUMENTS

| | | | |
|---|---|---|---|
| 6,508,860 B1 | 1/2003 | Kulkarni et al. | |
| 2009/0048094 A1 | 2/2009 | Ring et al. | |
| 2009/0107330 A1* | 4/2009 | Gu .................. | B01D 53/228 95/55 |
| 2011/0094380 A1* | 4/2011 | Li .................. | B01D 53/228 95/51 |
| 2012/0107203 A1* | 5/2012 | Arnold .................. | B01J 37/0246 423/213.5 |
| 2014/0315709 A1* | 10/2014 | Choi .................. | B01J 35/065 502/4 |
| 2015/0044130 A1* | 2/2015 | Tang .................. | B01D 71/028 423/648.1 |

FOREIGN PATENT DOCUMENTS

| | | |
|---|---|---|
| JP | 2012020209 A | 2/2012 |
| JP | 2013-126649 A | 6/2013 |
| KR | 10-2012-0033736 A | 4/2012 |
| KR | 10-2014-0127386 A | 11/2014 |
| KR | 10-1499905 A | 3/2015 |

OTHER PUBLICATIONS

Kalipcilar, Travis C. et al. "Synthesis and Separation Performance of SSZ-13 Zeolite Membranes on Tubular Supports", Chem. Mater., 14, 2002, pp. 3458-2464. (Year: 2002).*

Kim, Eunjoo et al., "Chemical Vapor Deposition on Chabazite (CHA) Zeolite Membranes for Effective Post-Combustion CO2 Capture", Environmental Science and Technology, vol. 48, No. 24, Dec. 5, 2014, pp. 14828-14836. (Year: 2014).*

Choi, J., et al., "Uniformly a-Oriented MFI Zeolite Films by Secondary Growth", "Angewandte Chemie International Edition", Dec. 30, 2005, pp. 1154-1158, vol. 45.

Diaz-Cabanas, M.-J., et al., "Synthesis and structure of pure SiO2 chabazite: the SiO2 polymorph with the lowest framework density", "Chemical Communications", Jan. 1, 1998, pp. 1881-1882, No. 17.

Eilertsen, E.A., et al., "Single parameter synthesis of high silica CHA zeolites from fluoride media", "Microporous and Mesoporous Materials", Dec. 17, 2011, pp. 94-99, vol. 153.

Fang, H., et al., "Prediction of CO2 Adsorption Properties in Zeolites Using Force Fields Derived from Periodic Dispersion-Corrected DFT Calculations", "The Journal of Physical Chemistry C", Apr. 19, 2012, pp. 10692-10701, vol. 116.

Kalipcilar, H., et al., "Synthesis and Separation Performance of SSZ-13 Zeolite Membranes on Tubular Supports", "Chemistry of Materials", Jul. 10, 2002, pp. 3458-3464, vol. 14, No. 8.

Kim, E., et al., "Uniform Si-CHA Zeolite Layers Formed by a Selective Sonication-Assisted Deposition Method", "Angewandte Chemie International Edition", Apr. 10, 2013, pp. 5280-5284, vol. 52.

Wang, Y., et al., "Adsorption Equilibrium of Carbon Dioxide and Water Vapor on Zeolites 5A and 13X and Silica Gel: Pure Components", "Journal of Chemical & Engineering Data", Jun. 11, 2009, pp. 2839-2844, vol. 54, No. 10.

Wang, Y., et al., "Adsorption Equilibrium of Binary Mixtures of Carbon Dioxide and Water Vapor on Zeolites 5A and 13X", "Journal of Chemical & Engineering Data", Jun. 4, 2010, pp. 3189-3195, vol. 55, No. 9.

Kim, Eunjoo, et al., "Chemical Vaper Deposition on Chabazite(CHA) Zeolite Membranes for Effective Post-Combusion CO2 Capture", Environmental Science & Technology, vol. 48, No. 24, Dec. 5, 2014.

* cited by examiner

CHABAZITE ZEOLITE MEMBRANE HAVING PORE SIZE CONTROLLED BY USING CHEMICAL VAPOR DEPOSITION AND METHOD OF PREPARING THE SAME

CROSS-REFERENCE TO RELATED APPLICATIONS

This application is a U.S. national phase under the provisions of 35 U.S.C. § 371 of International Patent Application No. PCT/KR2015/012278 filed Nov. 16, 2015, which in turn claims priority of Korean Patent Application No. 10-2014-0165182 filed Nov. 25, 2014. The disclosures of such international patent application and Korean priority patent application are hereby incorporated herein by reference in their respective entireties, for all purposes.

TECHNICAL FIELD

The present invention relates to a chabazite zeolite membrane with a controlled pore size and a production method thereof, and more particularly to a method of controlling the pore size of a chabazite zeolite membrane by chemical vapor deposition and to a chabazite zeolite membranechabazite zeolite membrane having a controlled pore size, produced by the method.

BACKGROUND ART

In general, zeolites are materials that have been used in a wide range of applications, including catalysis, separation, water softening, and adsorption. The rigid molecular-sized pore structures in zeolites make them appropriate for separating gas molecules via the recognition of the minute difference in their shapes and/or sizes.

The molecular sieve characteristics of such zeolite have the potential to selectively separate $CO_2$ from mixtures comprising $CO_2/N_2/H_2O$, which results from post-combustion processes, and natural gas mixtures comprising $CO_2/CH_4/H_2O$.

Furthermore, the pore size of 8-membered rings (8-MRs) in zeolite is greater than $CO_2$ and similar to or smaller than $N_2$ or $CH_4$, and thus is suitable for $CO_2$ separation. In particular, the molecular sizes of $CO_2$, $N_2$ and $CH_4$ are 0.33 nm, 0.364 nm and 0.38 nm, respectively, whereas the greatest size of the 8-membered rings is about 0.43 nm (D. W. Breck, Zeolite molecular sieves: structure, chemistry and use. 1974: John Wiley & Sons, Inc.).

Multiple 8-membered ring zeolite membranes were designed in an attempt to capture $CO_2$ from mixtures. Particularly, 8-membered zeolite and zeolite-like membranes such as DDR, SSZ-13 (CHA type) and SAPO-34 (CHA type) membranes are known to exhibit high performance for $CO_2$ separation. Among the 8-membered ring zeolites, the pore size of Si-CHA zeolite (M. J. Diaz-Cabanas, P. A. Barrett, M. A. Camblor, *Chem. Commun.* 1998, Issue 17, 1881-1882) consisting only of silica is about 0.370 nm×0.417 nm, which enables separation of $CO_2$ and $N_2$ by their size difference. Although the separation of $CO_2$ from $N_2$ can be achieved by size exclusion using 8-membered ring pore apertures of Si-CHA, the separation of $CO_2$ from $H_2O$ is more challenging due to the smaller molecular size of $H_2O$ (0.265 nm). In order to minimize $H_2O$ flux through CHA zeolite, hydrophilic properties, presumably due to Al constituents in CHA frameworks should be minimized, thus preferably requiring all-silica constituents (J. Choi, S. Ghosh, Z. P. Lai, M. Tsapatsis, *Angew. Chem.*, Int. Ed. 2006, 45, 1154-1158; Korean Patent Nos. 10-1499905 and 10-1460322).

To date, there have been very insufficient efforts to develop methods for fabricating hydrophobic silica zeolite membranes that have 8-MRs or similar porous structures and that have a high potential for $CO_2/N_2$ separation even in the presence of water. Rather, development has been performed to ensure $CO_2/N_2$ separation potential based on the high ability of $CO_2$ to be adsorbed into hydrophilic zeolite structures, but there is a problem in that, because the interaction between $CO_2$ and zeolite structures is reduced at high temperatures, $CO_2/N_2$ separation is possible only at low temperatures. When water is present in a feed that is supplied to zeolite membranes, there is a problem in that the competitive adsorption of $CO_2$ with water is reduced, and thus the preferential adsorption potential of $CO_2$ is reduced so that the $CO_2/N_2$ separation potential is reduced.

Accordingly, the present inventors have made extensive efforts to overcome the above-described problems occurring in the prior art, and as a result, have found that, when chemical vapor deposition is applied to silica chabazite zeolite particles to remove defects from a chabazite zeolite membrane and to effectively control the pore size of the membrane, it is possible to produce a chabazite zeolite membrane with a controlled pore size, which has enhanced $CO_2/N_2$ separation performance even not only under dry conditions, but also under moist conditions, thereby completing the present invention.

SUMMARY OF INVENTION

The present invention has been made in view of the above-described problems, and it is an object of the present invention to provide a method for producing a chabazite zeolite membrane, in which defects formed in the membrane are reduced and the size of pore space and/or pore mouth of the membrane is controlled so that the membrane can have excellent $CO_2/N_2$ separation performance even under moist conditions.

Another object of the present invention is to provide a chabazite zeolite membrane having a controlled pore size, in which the membrane has a high $CO_2/N_2$ separation factor by effectively controlling the pore size of the membrane and reducing the effect of defects on permeance.

DETAILED DESCRIPTION OF THE INVENTION

To achieve the above objects, the present invention provides a method of preparing a chabazite zeolite membrane having a controlled pore size using a chemical vapor deposition, comprising: (I) depositing plate-like silica chabazite zeolite particles onto a substrate or a support by sonicating the substrate or the support and a suspension of silica chabazite zeolite particles to, thereby forming a uniform seed layer; (II) producing a chabazite zeolite membrane by hydrothermally treating the substrate or the support having the uniform seed layer to grow the uniform seed layer; and (III) treating chemical vapor deposition (CVD) on the chabazite zeolite membrane while introducing silica precursor having a vapor-phase onto surface of the chabazite zeolite membrane.

The present invention also provides a chabazite zeolite membrane having a controlled pore size, wherein silica is deposited in pores on surface of pores mouth of the separation membrane which comprises silica chabazite zeolite formed on a substrate or support and has a plurality of pores.

The present invention also provides a method of separating $CO_2$ from a $CO_2$-containing gas mixture by using the chabazite zeolite membrane having a controlled pore size.

BRIEF DESCRIPTION OF THE DRAWINGS

FIG. 11 shows XRD patterns (e) of a CHA-L membrane (a) produced in Comparative Example 1, and a CHA-L-CVD-18 membrane (b), a CHA-L-CVD-36 membrane (c) and a CHA-L-CVD-72 membrane (d), which are produced in Example 2. In the XRD patterns (e) of FIG. 11, the peaks indicated by the symbol * indicate an $\alpha$-$Al_2O_3$ disc.

In FIG. 13, the left graphs show the results measured under a dry condition, and the right graphs show the results measured under a wet condition.

BEST MODE FOR CARRYING OUT THE INVENTION

Figure 1:
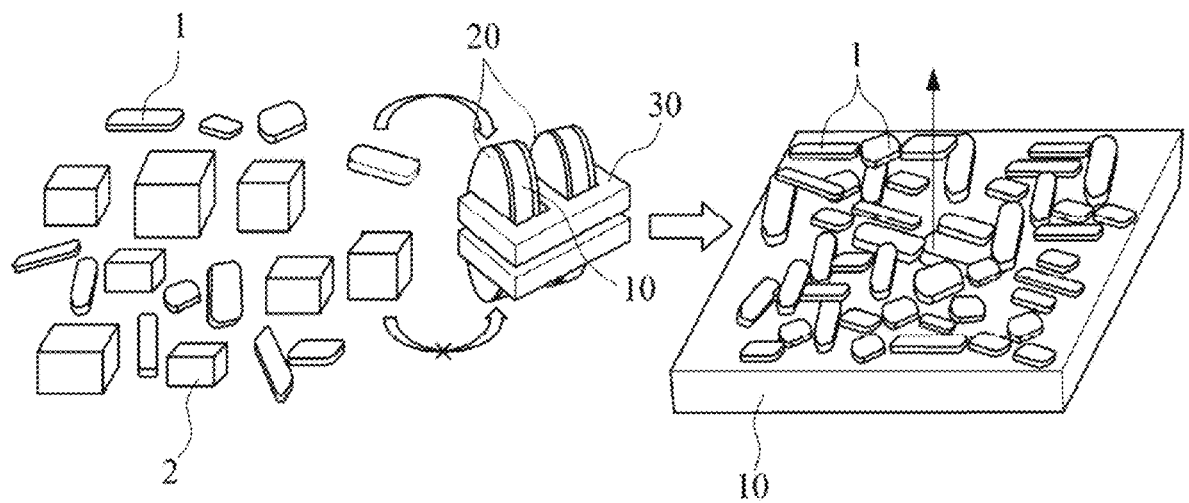
FIG. 1 is a conceptual diagram schematically showing a sonication-assisted method of selectively depositing plate-like silica chabazite zeolite particles according to the present invention.

Unless defined otherwise, all technical and scientific terms used herein have the same meaning as commonly understood by one of ordinary skill in the art to which the invention pertains. Generally, the nomenclature used herein and the experiment methods, which will be described below, are those well-known and commonly employed in the art.

As used herein, the term "chabazite zeolite membrane" means chabazite zeolite "grains" produced by depositing silica chabazite zeolite particles and subjecting the deposited particles as a seed (nucleus) to secondary growth. The term "chabazite zeolite membrane" is generally used interchangeably with the term "chabazite zeolite grains". Thus, the term more specifically means those included in a chabazite zeolite membrane and produced by depositing silica chabazite zeolite particles and subjecting the deposited particles to secondary growth. The term "chabazite zeolite membrane" is used interchangeably with the term "chabazite zeolite grains".

In the present invention, it has been found that a chabazite zeolite membrane with a controlled size of pore spaces and/or pore mouths can be produced by selectively depositing thin particles on a substrate or a support, growing the deposited particles as a uniform seed layer, then depositing silica in the pore space and/or pore mouth of the resulting chabazite zeolite membrane by a chemical vapor deposition process. In addition, it has been found that defects are removed from a chabazite zeolite membrane and the pore size of the membrane is effectively controlled, so that $CO_2/N_2$ separation performance can be enhanced even not only under dry conditions, but also under moist conditions.

Therefore, in one aspect, the present invention is directed to a method of preparing a chabazite zeolite membrane having a controlled pore size using a chemical vapor deposition, comprising: (I) depositing plate-like silica chabazite zeolite particles onto a substrate or a support by sonicating the substrate or the support and a suspension of silica chabazite zeolite particles to, thereby forming a uniform seed layer; (II) producing a chabazite zeolite membrane by hydrothermally treating the substrate or the support having the uniform seed layer to grow the uniform seed layer; and (III) treating chemical vapor deposition (CVD) on the chabazite zeolite membrane while introducing silica precursor having a vapor-phase onto surface of the chabazite zeolite membrane.

The silica chabazite zeolite particles may be prepared by heating a silica chabazite zeolite precursor solution containing a silica precursor, hydrofluoric acid, a templating agent and water. The silica chabazite zeolite precursor solution may be prepared by a method comprising the steps of: mixing TMAdaOH (N,N,N-trimethyl-1-adamantanammonium hydroxide), ethanol, water and tetraethyl orthosilicate (TEOS); heating the mixture to prepare powder; crushing the powder and adding hydrofluoric acid dropwise thereto. The heating may be performed at a temperature of 150 to 200° C. for 12-240 hours, and the method may further comprise, before the forming of the uniform seed layer, a step of calcining the silica chabazite zeolite particles at a temperature of 500 to 700° C. with a ramp rate of 0.1-10° C./min for 2-72 hours under an air or oxygen flow of 100-500 cc/min.

The substrate or support may be made of one or more selected from the group consisting of silicon, glass, alumina, zirconia, titania, ceria and vanadia, and may preferably be configured as an alpha-alumina ($\alpha$-$Al_2O_3$) disc.

In the present invention, the silica precursor used in the production of the silica chabazite zeolite particles and during chemical vapor deposition (CVD) of step (III) may be one or more selected from the group consisting of silane, dimethylsilane, trimethylsilane, tetramethylsilane, diethylsilane, tetramethyl orthosilicate (TMOS), tetraethyl orthosilicate (TEOS), octamethyltrisiloxane (OMTS), octamethylcyclotetrasiloxane (OMCTS), tetramethyldimethyldimethoxydisilane, tetramethylcyclotetrasiloxane (TOMCATS), dimethyldimethoxysilane (DMDMOS), diethoxymethylsilane (DEMS), methyltriethoxysilane (MTES), phenyldimethylsilane, and phenylsilane.

In the present invention, the silica chabazite zeolite particles after step (I) can satisfy the following Equations 1 and 2:

$$0.01 \leq \frac{z}{x} \leq 0.5 \quad \text{[Equation 1]}$$

$$0.1 \leq \frac{x}{y} \leq 10 \quad \text{[Equation 2]}$$

wherein x is the average length of the particles, y is the average width of the particles, and z is the average height of the particles.

The hydrothermal treatment may be performed at a temperature of 100 to 200° C. for 24 hours or more, preferably 24-96 hours, more preferably 48-96 hours, and may be performed using a solution containing 100 $SiO_2$:1-100 $Na_2O$:0.1-10 $Al_2O_3$:20 TMAdaOH:1000-40000 $H_2O$ (molar ratio), preferably 100 $SiO_2$:10 $Na_2O$:2.5 $Al_2O_3$:20 TMAdaOH:4400 $H_2O$ (molar ratio). The method may further comprise, after the hydrothermal treatment, a step of calcining the chabazite zeolite membrane at a temperature of 500 to 700° C. with a ramp rate of 0.1-10° C./min for 2-72 hours under an air or oxygen flow of 100-500 cc/min. The chabazite zeolite membrane produced in step (II) may have a Si/Al molar ratio of 5-1,000, preferably 5-500, more preferably 10-100.

The chemical vapor deposition (CVD) reaction may be performed at a temperature of 50 to 500° C. for 6-144 hours. In addition, the method may further comprise, before step (III), a step of preheating the chabazite zeolite membrane, produced in step (II), at a temperature of 450 to 550° C. for 0.5-2 hours.

The method may further comprise a step of calcining the chabazite zeolite membrane having a controlled pore size, produced in step (III), at a temperature of 500 to 550° C. with a ramp rate of 0.1-10° C./min, preferably 0.5° C./min, under an air flow of 150-250 ml/min.

In another aspect, the present invention is directed to a chabazite zeolite membrane having a controlled pore size, wherein silica is deposited on the surface of a pore space and/or a pore mouth of a membrane, which comprises silica chabazite zeolite formed on a substrate or support and has a plurality of pores, so as to control the size of the pores.

Herein, the chabazite zeolite membrane having a controlled pore size may have a pore size of 0.25-0.37 nm, preferably 0.30-0.36 nm, more preferably 0.34-0.36 nm.

The substrate or support may be made of one or more selected from the group consisting of silicon, glass, alumina, zirconia, titania, ceria and vanadia, and may preferably be configured as an alpha-alumina ($\alpha$-$Al_2O_3$) disc.

The silica deposited on the surface of pore space and/or pore mouth of the membrane may serve to control one or more defects present in the chabazite zeolite membrane.

In another aspect, the present invention is directed to a method of separating $CO_2$ from a $CO_2$-containing gas mixture by using the chabazite zeolite membrane having a controlled pore size.

The $CO_2$-containing gas mixture may be natural gas, synthetic gas, or pre-combustion gas. Specifically, the $CO_2$-containing gas mixture may be either a gas mixture relevant to biogas upgrading, or a gas mixture produced after a water-gas shift reaction.

According to a preferred embodiment of the present invention, a method for producing a chabazite zeolite membrane having a controlled pore size may comprise the steps of:

(I) mixing a silica precursor, hydrofluoric acid, a templating agent and water to prepare a silica chabazite zeolite precursor solution;

(II) heating the silica chabazite zeolite precursor solution to prepare chabazite zeolite particles;

(III) suspending the silica chabazite zeolite particles in a solvent, and sonicating the suspension to selectively deposit plate-like chabazite zeolite particles onto a substrate or support, thereby forming a uniform seed layer;

(IV) subjecting the uniform seed layer to secondary growth using hydrothermal growth, thereby producing a chabazite zeolite membrane; and (V) controlling the size of any one portion, selected from among a pore space, a pore mouth and a combination of the pore space and the pore mouth, by a chemical vapor deposition process in which a vapor-phase silica precursor is flushed onto the surface of the chabazite zeolite membrane to deposit silica on the surface of any one portion selected from among the pore space, the pore mouth and the combination of the pore space and the pore mouth.

First, in step (I), a silica precursor, hydrofluoric acid, a templating agent and water are mixed with one another to prepare a silica chabazite zeolite precursor solution, and in step (II), the silica chabazite zeolite precursor solution is hydrothermally reacted to prepare silica chabazite zeolite particles. In the prepared silica chabazite zeolite particles, nearly cubic (for convenience, referred to as "cubic" in the detailed description and the appended claims) silica chabazite zeolite particles as a dominant product are present together with plate-like (for convenience, referred to as "plate" or "plate-like" in the detailed description and the appended claims) silica chabazite zeolite particles as a minor product.

A specific process for preparing the silica chabazite zeolite particles preferably comprises the following five steps (steps (I-1) to (I-5)).

As the templating agent, TMAdaOH (N,N,N-trimethyl-1-adamantanammonium hydroxide) is preferably used.

First, in step (I-1), TMAdaOH (N,N,N-trimethyl-1-adamantanammonium hydroxide) and ethanol are mixed with each other in a Teflon beaker to prepare a mixture, and in step (I-2), tetraethyl orthosilicate (TEOS) is added to the mixture of step (I-1) to prepare a mixture. Herein, the tetraethyl orthosilicate (TEOS) is most preferably used as a silica precursor.

In step (I-3), in order to control the molar ratio of $H_2O$ to silica ($SiO_2$) in the mixture of step (I-2), the mixture is heated to prepare powder. In step (I-4), the powder prepared in step (I-3) is finely crushed to prepare a precursor, and then in step (I-5), hydrofluoric acid is added dropwise to the precursor of step (I-4) to prepare a silica chabazite zeolite precursor solution. Next, the silica chabazite zeolite precursor solution is hydrothermally reacted at high temperature to prepare silica chabazite zeolite particles. Herein, the heating is preferably performed at a high temperature of 150 to 190° C. for 12-240 hours.

The silica chabazite zeolite precursor solution preferably has a molar composition of 10 $SiO_2$:5 TMAdaOH:5 HF:10-30 $H_2O$.

Next, a calcining step may further be performed in order to eliminate undesired effects from the produced membrane. The calcining step may be performed at a temperature of 500 to 700° C. with a ramp rate of 0.1-10° C./min for 2-72 hours under an air or oxygen flow of 100-500 cc/min.

Among the silica chabazite zeolite particles prepared as described above, plate-like chabazite zeolite particles have the shortest dimension perpendicular to the large basal plane, and thus are beneficial in forming an oriented layer in the out-of-plane direction. For this reason, it is preferable to deposit only plate-like silica chabazite zeolite particles onto a substrate or support.

In other words, even though the plate-like silica chabazite zeolite particles are present in relatively small amounts, sonication may be used in the present invention to selectively deposit these particles onto a substrate or support.

Thus, in step (III), the silica chabazite zeolite particles are suspended in a solvent, and the suspension is sonicated to selectively deposit plate-like silica chabazite zeolite particles onto a substrate or support, thereby forming a uniform seed layer.

Through the above-described sonication-assisted method of selectively physically depositing a small amount of the plate-like silica chabazite zeolite particles onto the substrate or support, a uniform hOh-out-of-plane oriented layer can be successfully formed.

Because conventional cubic silica chabazite zeolite particles have a wide size distribution (about 1-10 μm) that interferes with formation of a uniform layer, it is difficult to obtain an effective silica chabazite zeolite membrane from the conventional particles by secondary growth. Accordingly, it is preferred that, among silica chabazite zeolite particles, plate-like silica chabazite zeolite particles that are produced in small amounts be selectively deposited onto an alpha-alumina disc to form a uniform hOh-out-of-plane oriented layer.

In this case, the plate-like silica chabazite zeolite particles preferably satisfy all of the following equations 1 and 2:

$$0.01 \leq \frac{z}{x} \leq 0.5 \quad \text{Equation 1}$$

$$0.1 \leq \frac{x}{y} \leq 10 \quad \text{Equation 2}$$

wherein x is the average length of the particles, y is the average width of the particles, and z is the average height of the particles.

If z/x in equation 1 is less than 0.01, the object of the present invention will hardly be achieved, because particles having this value would not be formed, or although formed, particles are prone to be broken and are likely to be broken in a random form. If z/x in equation 1 is more than 0.5, particles will be morphologically similar to cubic particles which cannot form a uniform seed layer, and thus a silica chabazite zeolite membrane having an excellent $CO_2/N_2$ separation factor cannot be produced.

In addition, if x/y in equation 2 is less than 0.1 or more than 10, the particle shape will be more like a bar than a plate, and the use of such particles cannot achieve the object of the present invention.

More specifically, the step of selectively depositing plate-like silica chabazite zeolite particles onto a substrate or support by sonication can be achieved by the following three sequential steps.

The first step is a step in which, among silica chabazite zeolite particles comprising a relatively small amount of plate-like silica chabazite zeolite particles and a relatively large amount of cubic silica chabazite zeolite particles, the plate-like silica chabazite zeolite particles are preferentially allowed to reach a substrate or support. More specifically, this step is performed by controlling accessibility to preferentially allow the plate-like inorganic particles to reach the substrate or support through a gap between the substrate or support and glasses sandwiching the substrate or support. [Kim, E.; Cai, W.; Baik, H.; Choi, J., Angew. Chem., Int. Ed. 2013, 52 (20), 5280-5284]

This accessibility depends on the shape of the silica chabazite zeolite particles, and is controlled such that the plate-like silica chabazite zeolite particles satisfying both equation 1 and equation 2 selectively reach the substrate or support. Herein, the substrate or support is preferably plate-like or cylindrical.

The second step is a step in which the plate-like silica chabazite zeolite particles that reached the substrate or support are sonicated so as to be uniformly deposited. The sonication is preferably performed using a sonicator.

In the third step, the uniformly deposited plate-like silica chabazite zeolite particles are physically bound to the substrate or support to form a uniform layer. Specifically, through the third step, the seed particles are attached to the surface of the substrate, for example, an alumina disc, while a uniform layer (also referred to herein as "uniform seed layer" or "seed layer") is formed.

Such a series of processes is as follows. As shown in FIG. 1, an alpha-alumina disc 10, which is a substrate disposed between cover glasses 20 fixed by a Teflon holder 30, is placed in a glass reactor containing silica chabazite zeolite particles (a mixture of plate-like particles 1 and cubic particles 2), and the glass reactor is sealed with a parafilm, and then placed in a sonicator, followed by sonication.

Herein, the substrate or support is preferably any one selected from the group consisting of a silicon disc, a glass disc, an alumina disc, and an alpha-alumina (α-$Al_2O_3$) disc, and the substrate or the support may be any porous or nonporous substrate or support, but the alpha-alumina disc is most preferably used.

Next, a step of calcining the uniform seed layer formed as described above may further be performed to bind the seed particles to the substrate.

In step (IV), the uniform seed layer is subjected to secondary growth using hydrothermal growth. Herein, the uniform seed layer may be grown in a solution having a molar ratio of 100 $SiO_2$:10 $Na_2O$:20 TMAdaOH:4400 $H_2O$.

Specifically, the hydrothermal growth may be performed in an autoclave at 100 to 190° C. for 24 hours, and the uniform seed layer may be reacted with a solution having a molar ratio of 100 $SiO_2$:10 $Na_2O$:20 TMAdaOH:4400 $H_2O$, thereby producing a chabazite zeolite membrane.

Next, a calcining step may further be performed in order to eliminate undesired impurities from the produced membrane. Herein, the calcining step may be performed at a temperature of 500 to 700° C. with a ramp rate of 0.1-10° C./min for 2-24 hours under an air or oxygen flow of 100-500 cc/min.

Finally, in step (V), the size of any one portion, selected from among a pore space, a pore mouth and a combination of the pore space and the pore mouth, is controlled by a chemical vapor deposition process in which a vapor-phase silica precursor is flushed onto the surface of the chabazite zeolite membrane of step (IV) to deposit silica on the surface of any one portion selected from among the pore space, the pore mouth and the combination of the pore space and the pore mouth.

Herein, the chabazite zeolite membrane resulting from step (IV) is preferably preheated at a temperature of 450 to 550° C. for 0.5-2 hours, thereby activating the membrane. The preheating is performed in order to increase the reactivity of the membrane with a vapor-phase silica precursor to be introduced in the subsequent chemical vapor deposition step, thereby increasing the deposition rate of the precursor. If the activation (preheating) temperature is low, the reactivity with the vapor-phase silica precursor will be low, and thus the pore size (pore space and pore mouth) of the chabazite zeolite membrane cannot be controlled to a desired pore size in the subsequent chemical vapor deposition process, and existing cracks in the membrane cannot be sufficiently filled. On the other hand, if the preheating temperature is higher than 550° C., the preheating process may damage and cause defects in the chabazite zeolite membrane.

In addition, the silica precursor may be any one selected from the group consisting of silane, dimethylsilane, trimethylsilane, tetramethylsilane, diethylsilane, tetramethyl orthosilicate (TMOS), tetraethyl orthosilicate (TEOS), octamethyltrisiloxane (OMTS), octamethylcyclotetrasiloxane (OMCTS), tetramethyldimethoxydisilane, tetramethylcyclotetrasiloxane (TOMCATS), dimethyldimethoxysilane (DMDMOS), diethoxymethylsilane (DEMS), methyltriethoxysilane (MTES), phenyldimethylsilane, and phenylsilane. Tetraethyl orthosilicate (TEOS) available at the lowest cost is most preferably used as the silica precursor.

In addition, the chemical vapor deposition (CVD) step (step (V)) is preferably performed at a temperature of 50 to 500° C. for 6-144 hours while the vapor-phase silica precursor is flushed. To provide the best $CO_2/N_2$ separation factor and $CO_2$ permeance, step (V) is most preferably performed at 200° C. for 34-38 hours.

If the chemical vapor deposition step is performed under conditions lower than the lower limits of the above ranges, problems will arise in that, because the vapor-phase silica precursor is not sufficiently deposited on the surface of pore space and pore mouth of the chabazite zeolite membrane, the pore size is not effectively controlled, and defects present in the membrane are not sufficiently filled up, and thus the $CO_2/N_2$ separation factor and $CO_2$ permeance of the membrane are lower than those of a conventional NaY membrane. Accordingly, the overall performance of the membrane will be reduced, and thus the use of the membrane for carbon dioxide capture will be limited. On the other hand, if the chemical vapor deposition step is performed under conditions higher than the upper limits of the above ranges, problems will arise in that silica is excessively deposited on the surface of pore space or pore mouth of the chabazite zeolite membrane to increase the thickness of the membrane and to make it impossible to achieve uniform control of the pore size, and thus the $CO_2/N_2$ separation factor and $CO_2$ permeance of the membrane are significantly reduced.

In other words, in the method of producing the chabazite zeolite membrane from the uniform seed layer by secondary growth as described above, an out-of-plane oriented layer which is very uniform compared to a conventional membrane produced using cubic zeolite particles can be formed by selectively depositing only plate-like silica chabazite zeolite particles, and a desired uniform layer can be reproducibly formed by subjecting the oriented layer as a uniform seed layer to secondary growth.

In addition, the silica chabazite zeolite membrane produced as described above is improved in terms of $CO_2/N_2$ separation performance and $CO_2$ permeance thereof is maintained, because the size of any one portion, selected from among a pore space, a pore mouth and a combination of the pore space and the pore mouth, can be finely controlled under the chemical vapor deposition conditions and because a large amount of defects present in the membrane can be filled up.

Furthermore, it was found that the $CO_2/N_2$ separation factor of the silica chabazite zeolite membrane in a wet condition reached up to 8.8, which is significantly higher than those of other conventional membranes. Particularly, this $CO_2/N_2$ separation factor value is about 3-fold higher than that of a simple silica chabazite zeolite membrane whose pore size was not controlled.

The thermal decomposition reaction by chemical vapor deposition of the silica precursor under the chemical vapor deposition conditions according to the present invention as described above occurs not only on the surface of the pore mouth of the silica chabazite zeolite membrane, but also on the surface of the pore space, and thus the pore size can be more finely controlled. This control is more specifically shown in FIG. 3.

Figure 3:
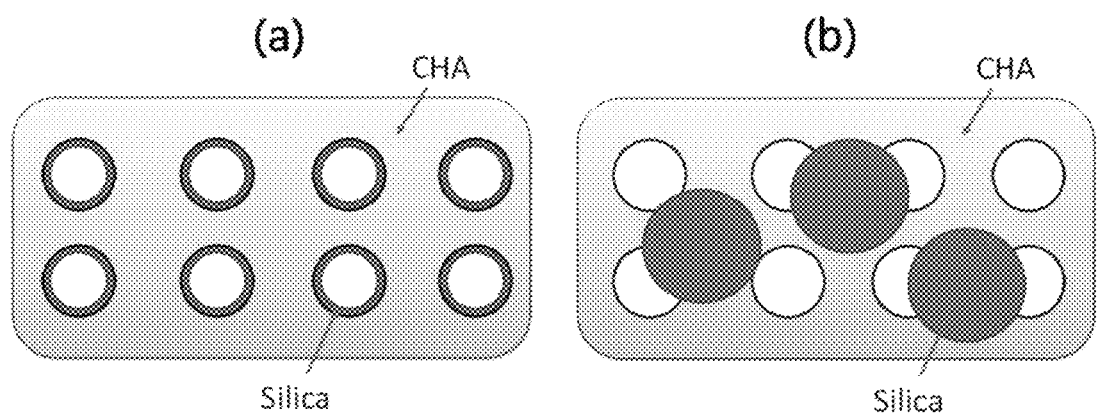
FIG. 3 schematically illustrates silica deposited on the surface of pore space or pore mouth of silica chabazite zeolite by chemical vapor deposition according to the present invention.

In FIG. 3, schematic (a) illustrates silica deposited on the surface of the pore space by chemical vapor deposition, and schematic (b) illustrates silica deposited on the surface of the pore mouth by chemical vapor deposition.

As shown in FIG. 3, "deposition of silica on the surface of the pore mouth by chemical vapor deposition" does not mean that the pore mouth is not completely covered, but means that silica is deposited on the surface of the pore mouth to reduce the area of the pore mouth.

Conventional silica chabazite zeolite membranes had a pore size of about 0.37×0.42 nm, and thus could separate $CO_2$ and $N_2$ from each other. However, there was some difficulty in separating $CO_2$ and $N_2$ from each other, because $CO_2$ and $N_2$ have similar molecular sizes.

However, according to the present invention, the pore size can be finely reduced by depositing silica onto the surface of pore space and pore mouth of the silica chabazite zeolite membrane through chemical vapor deposition, so that the membrane can effectively capture $CO_2$. Herein, the controlled pore size may preferably be 0.34-0.36 nm.

Additionally, the silica chabazite zeolite membrane produced in step (IV) has one or more defects. More specifically, such defects are those formed at a chabazite zeolite grain boundary included in the chabazite zeolite membrane.

Such defects reduce the permeance and separation potential of the chabazite zeolite membrane. For this reason, through the silica chemical vapor deposition process of step (V), silica is deposited on the surface of any one portion selected from among a pore space, a pore mouth and a combination of the pore space and the pore mouth to finely control the pore size and to eliminate defects, so that pores having a uniform size are formed. Thus, the carbon dioxide separation performance of the membrane is further improved. More specifically, the defects are preferably controlled to a size of 0.1-0.3 nm.

Furthermore, the chabazite zeolite membrane produced according to the above-described production method of the present invention has hydrophobicity, even when silica is deposited on the surface of the pore space and/or the pore mouth by chemical vapor deposition. Accordingly, the membrane according to the present invention can adsorb a small amount of water and can be less influenced by $H_2O$ having a size smaller than $CO_2$, resulting in increases in the $CO_2/N_2$ separation factor and $CO_2$ permeance of the membrane. Namely, the chabazite zeolite membrane with a controlled pore size according to the present invention can provide effective carbon dioxide capture properties, which can separate $CO_2$ from $N_2$ and can also separate $CO_2$ from $H_2O$. More specifically, the chabazite zeolite membrane with a controlled pore size according to the present invention has a high carbon dioxide permeance and a high $CO_2/N_2$ separation factor.

The $CO_2$ permeance and the CO2/N2 separation factor may vary depending on the kind of substrate or support of the chabazite zeolite membrane. Generally, the $CO_2$ permeance is $1.0 \times 10^{-7}$ mol·m$^{-2}$·s$^{-1}$·Pa$^{-1}$ or higher, and the $CO_2/N_2$ separation factor is 2.0 or higher, indicating that the chabazite zeolite membrane exhibits an excellent effect on carbon dioxide capture.

Particularly, when a chabazite zeolite membrane with a controlled pore size is produced using alpha-alumina as a support, it has a $CO_2$ permeance of $0.1$-$4.0 \times 10^{-7}$ mol·m$^{-2}$·s$^{-1}$·Pa$^{-1}$ and a $CO_2/N_2$ separation factor of 2.1-9.

In addition, in yet another aspect, the present invention is directed to a chabazite zeolite membrane having a controlled pore size, comprising: a substrate or support; a membrane, which comprises silica chabazite zeolite formed on the substrate or support and has a plurality of pores; and silica deposited on the surface of a pore space and/or a pore mouth of the membrane.

The chabazite zeolite membrane has a high content of silica, and may preferably have a Si/Al molar ratio of 5-500.

More specifically, the chabazite zeolite membrane may be produced by depositing plate-like silica chabazite zeolite particles satisfying the following equations 1 and 2 onto the substrate or support to form a uniform seed layer, and subjecting the uniform seed layer to hydrothermal growth:

$$0.01 \leq \frac{z}{x} \leq 0.5 \quad \text{[Equation 1]}$$

$$0.1 \leq \frac{x}{y} \leq 10 \quad \text{[Equation 2]}$$

wherein x is the average length of the particles, y is the average width of the particles, and z is the average height of the particles. The membrane produced using plate-like silica chabazite zeolite particles as a seed provides an out-of-plane oriented layer that is very uniform compared to a membrane produced using cubic zeolite particles. Thus, the plate-like silica chabazite zeolite particles are preferably used.

If z/x in equation 1 is less than 0.01, the object of the present invention will hardly be achieved, because particles having this value would not be formed, or although formed, particles are prone to be broken and are likely to be broken in a random form. If z/x in equation 1 is more than 0.5, particles will be morphologically similar to cubic particles which cannot form a uniform seed layer, and thus a silica chabazite zeolite membrane having an excellent $CO_2/N_2$ separation factor cannot be produced.

In addition, if x/y in equation 2 is less than 0.1 or more than 10, the particle shape will be more like a bar than a plate, and thus a uniform layer cannot be formed.

The silica chabazite zeolite membrane with a controlled pore size can be improved in terms of $CO_2/N_2$ separation performance and $CO_2$ permeance thereof is maintained, because the pore size is finely controlled by silica deposited on the surface of the pore space and/or the pore mouth. The silica chabazite zeolite membrane with a controlled pore size may preferably have a pore size of 0.34-0.36 nm.

Further, the silica chabazite zeolite membrane has one or more defects. More specifically, such defects are those formed at a chabazite zeolite grain boundary included in the chabazite zeolite membrane.

Such defects reduce separation potential of the chabazite zeolite membrane.

However, the carbon dioxide separation performance of the silica chabazite zeolite membrane with a controlled pore size according to the present invention is further improved, because silica deposited on the surface of the pore space and/or the pore mouth fills and eliminates defects present in the silica chabazite zeolite membrane to make the pore size uniform. More specifically, the defects are preferably controlled to a size of 0.1-0.3 nm.

Moreover, the chabazite zeolite membrane having a controlled pore size according to the present invention has hydrophobicity, and thus can adsorb a small amount of water and can be less influenced by $H_2O$ having a size smaller than $CO_2$, resulting in increases in the $CO_2/N_2$ separation factor and $CO_2$ permeance of the membrane. In other words, the chabazite zeolite membrane according to the present invention can provide effective carbon dioxide capture properties, which can separate $CO_2$ from $N_2$ and can also separate $CO_2$ from $H_2O$.

The $CO_2$ permeance and the CO2/N2 separation factor may vary depending on the kind of substrate or support of the chabazite zeolite membrane. Generally, the $CO_2$ permeance is $1.0 \times 10^7$ mol·m$^{-2}$·s$^{-1}$·Pa$^{-1}$ or higher, and the $CO_2/N_2$ separation factor is 2.0 or higher, indicating that the chabazite zeolite membrane exhibits an excellent effect on carbon dioxide capture.

Particularly, when a chabazite zeolite membrane with a controlled pore size is produced using alpha-alumina as a support, it has a $CO_2$ permeance of $0.1$-$4.0 \times 10^7$ mol·m$^{-2}$·s$^{-1}$·Pa and a $CO_2/N_2$ separation factor of 2.1-9.

EXAMPLES

Hereinafter, the present invention will be described in further detail with reference to examples. It will be obvious to a person having ordinary skill in the art that these examples are illustrative purposes only and are not to be construed to limit the scope of the present invention.

Preparation Example 1: Synthesis of Si-Chabazite Zeolite (CHA-L) Particles

Silica chabazite zeolite (Si-CHA or CHA) particles were synthesized using a modification of a method described in the literature (M. J. Diaz-Cabanas, P. A. Barrett, M. A. Camblor, *Chem. Commun.* 1998, 1881-1882; E. A. Eilertsen, B. Arstad, S. Svelle, K. P. Lillerud, Microporous Mesoporous Mater. 2012, 153, 94-99).

Specifically, N,N,N-trimethyl-1-adamantanammonium hydroxide (TMAdaOH, 25 wt % in $H_2O$, SACHEM Inc.) and ethanol (200 proof, Sigma-Aldrich) were mixed with deionized water in a Teflon beaker. Then, tetraethyl orthosilicate (TEOS, 98% Sigma-Aldrich) was added to the mixture. The water was gradually removed until the molar ratio of $H_2O$ to silica ($SiO_2$) would reach about 2.4, while the Teflon beaker was heated. The synthesized mixture having this molar ratio was nearly solid, and was crushed into fine powder (solid-like precursor) by use of a pestle before addition of hydrofluoric acid (HF). Next, a hydrofluoric acid solution (48 wt %, Sigma-Aldrich) was added dropwise to the solid-like precursor in the beaker. The precursor was mixed using a spatula so as to be homogenized. The produced synthetic precursor was transferred to a Teflon liner, and then reacted at 160° C. with rotation. After about 42 hours, the reaction was stopped using service water. The synthesized CHA-L particles were recovered by vacuum filtration and washed with a large amount of deionized water.

The final molar composition of the synthesized precursor was 10 $SiO_2$:5 TMAdaOH:5 HF:30 $H_2O$.

This molar composition was named "composition t", which corresponds to a thin composition. The resulting CHA particles were calcined at a temperature of 600° C. with a ramp rate of 1° C./min for 12 hours under an air or oxygen flow of 200 ml/min (Pluskolab, model: CRF-M20-UP).

Preparation Example 2: Synthesis of Si-Chabazite Zeolite (CHA-H) Particles

Si-chabazite zeolite (CHA-H) particles were produced in the same manner as described in Example 1, except that the reaction was performed at 190° C. for 12 hours.

Figure 2A:
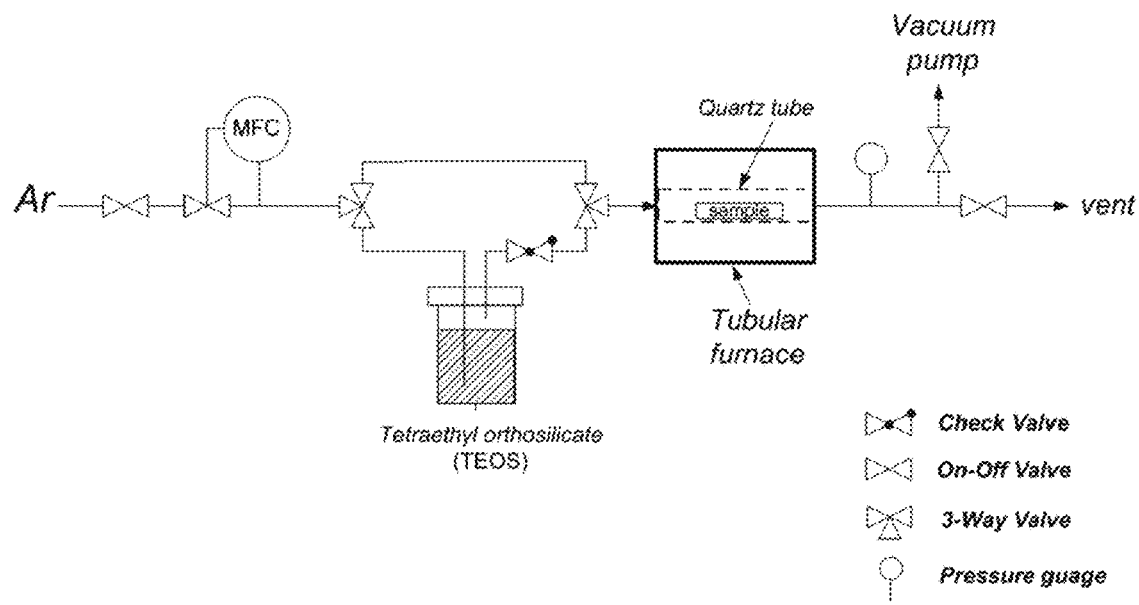
FIG. 2a is a conceptual diagram schematically showing a chemical vapor deposition method according to the present invention.
Figure 2B:
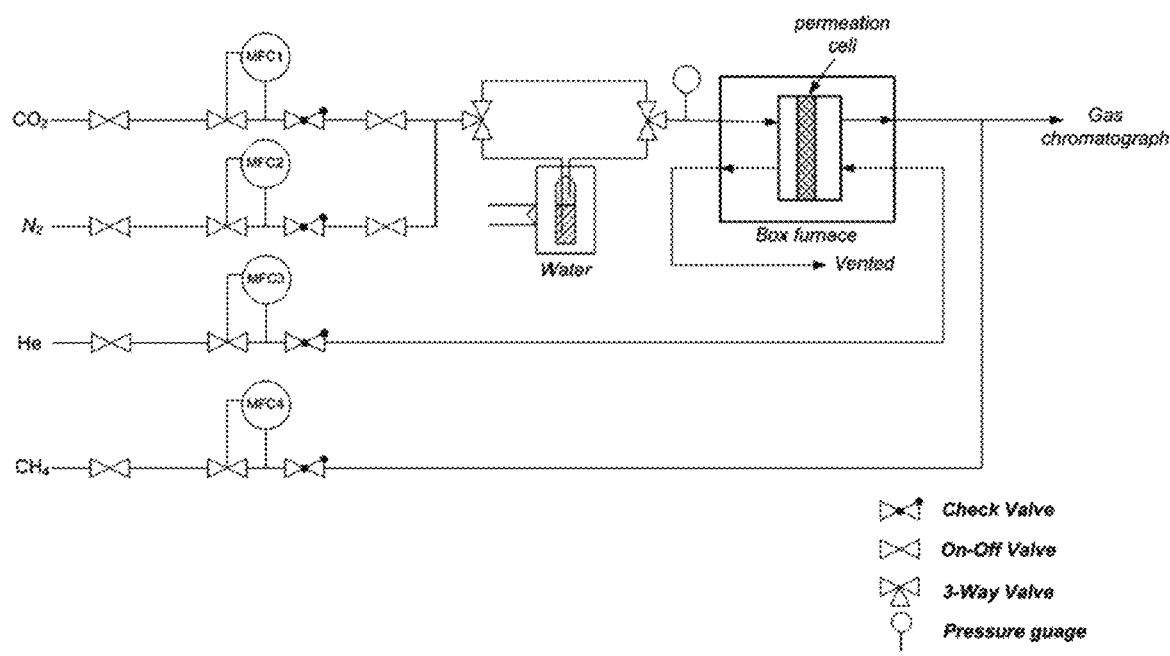
FIG. 2b is a conceptual view schematically showing a system used to measure the gas permeation performance of a membrane.

Example 1: Production of Si-Chabazite Zeolite (CHA-L, H-CVD-x) Particles with Controlled Pore Size 0.2 of the Si-chabazite zeolite (CHA-L or CHA-H) particles prepared in Preparation Example 1 or Preparation Example 2 was placed in a quartz tube which was then placed in a tubular furnace. Before control of the pore size by chemical vapor deposition, the CHA-L or CHA-H particles were preheated at a temperature of 550° C. with a ramp rate of 5° C./min for 1 hour under an argon gas flow of 150 ml/min, and then cooled to 500° C. Then, a chemical vapor deposition reaction, in which vapor-phase TEOS was introduced, was performed for varying periods of time, and the particles were cooled to room temperature under an argon atmosphere, thereby producing Si-chabazite zeolite (CHA-L(H)-CVD-x) having a controlled pore size. Herein, x indicates the time during which the chemical vapor deposition reaction was performed, and the chemical vapor deposition reaction process was performed using a system shown in FIG. 2a.

Example 2: Production of Chabazite Zeolite Membrane (CHA-L-CVDx) with Controlled Pore Size 1) As shown in FIG. 1, an alpha-alumina disc 10 disposed between cover glasses 20 fixed by a Teflon holder 30 was placed in a glass reactor (not shown) containing about 0.05 g of the dried and calcined CHA particles (a mixture of plate-like particles 1 and cubic particles 2), and then about 40 mL of dry toluene (anhydrous 99.8%, Sigma-Aldrich) was placed in the glass reactor. All the procedures were performed under an argon atmosphere. Next, the glass reactor was sealed with a parafilm, and then placed in a sonicator (JEIO TECH, UC-10P), and then the sealed reactor was sonicated for about 20 minutes. Finally, the seeded alpha-alumina disc was calcined at 450° C. with a ramp rate of 1° C./min for 4 hours.

2) Using the seeded alpha-alumina disc obtained in step 1), a chabazite zeolite membrane was produced by secondary growth. Using a solution having a molar ratio of 100 $SiO_2$:10 $Na_2O$:2.5 $Al_2O_3$:20 TMAdaOH:4400 $H_2O$ based on a composition described in the literature (H. Kalipcilar, T. C. Bowen, R. D. Noble, J. L. Falconer, Chem. Mater. 2002, 14, 3458-3464), the seeded alpha-alumina disc was hydrothermally treated in an autoclave at about 160° C. for about 3 days. The resulting silicon chabazite zeolite membrane was calcined at 550° C. with a ramp rate of 0.5° C./min for 12 hours under an air flow of 200 ml/min (Pluskolab, model: CRFM20-UP).

3) The calcined chabazite zeolite (CHA-L) membrane was heated at 500° C. for 1 hour under an air flow of 200 ml/min, and tetraethyl orthosilicate (TEOS) was introduced onto the surface of the chabazite zeolite membrane by chemical vapor deposition (CVD) at 200° C. Herein, the chemical vapor deposition was performed for varying periods of time (18 to 72 hours). The chemically vapor deposited chabazite zeolite membrane was calcined at 550° C. with a ramp rate of 0.5° C./min under an air flow of 200 ml/min, thereby producing a chabazite zeolite membrane (CHA-L-CVD-x) with a controlled pore size. Herein, x indicates the time during which the chemical vapor deposition was performed.

Comparative Example 1: Production of Chabazite Zeolite (CHA-L) Membrane Whose Pore Size was not Controlled A chabazite zeolite membrane was produced in the same manner as described in Example 2, except that the chemical vapor deposition process (step (3)) was not performed. Herein, to form a seed layer, the dried and calcined CHA-L particles (a mixture of plate-like particles 1 and cubic particles 2) of Preparation Example 1 were used.

Figure 4:
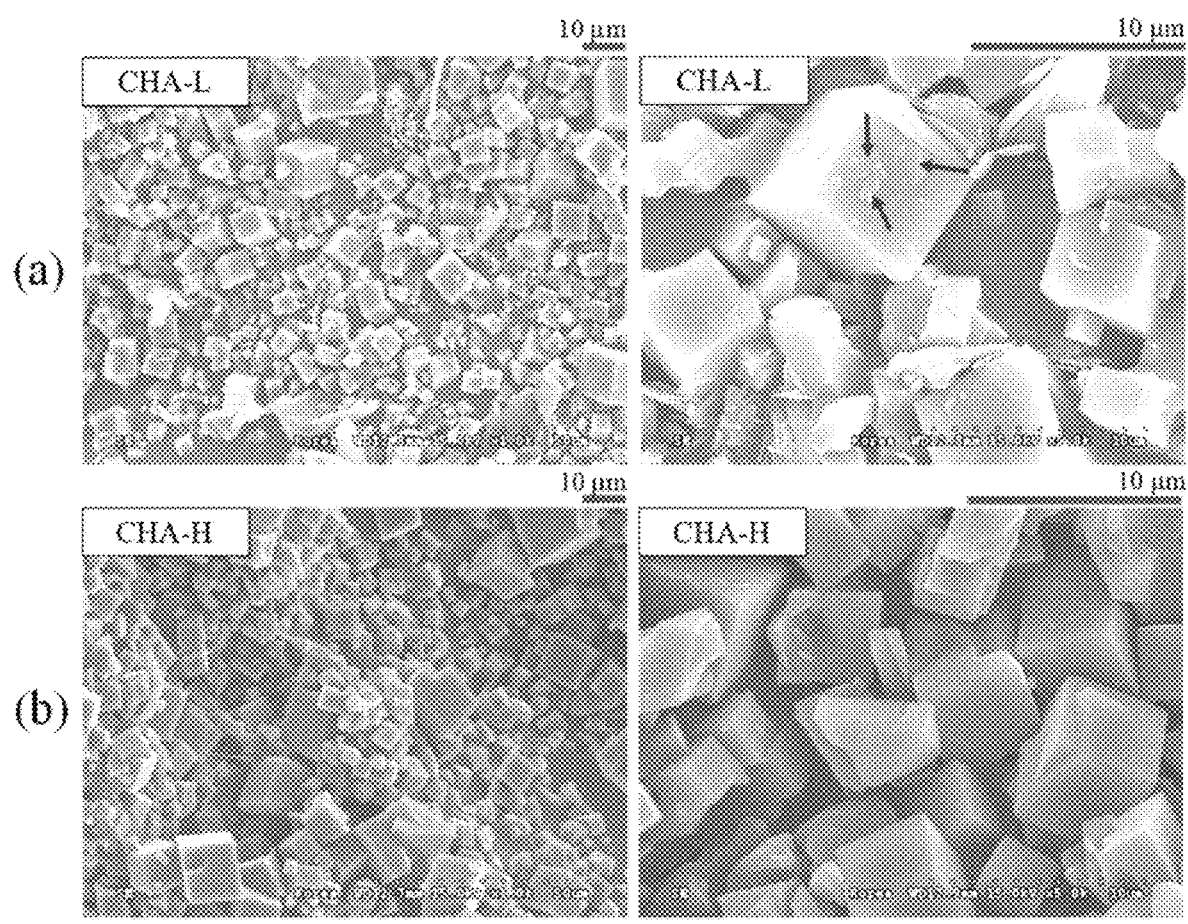
FIG. 4 shows SEM images of CHA-L particles, prepared in Preparation Example 1, and CHA-H particles prepared in Preparation Example 2.
Figure 5:
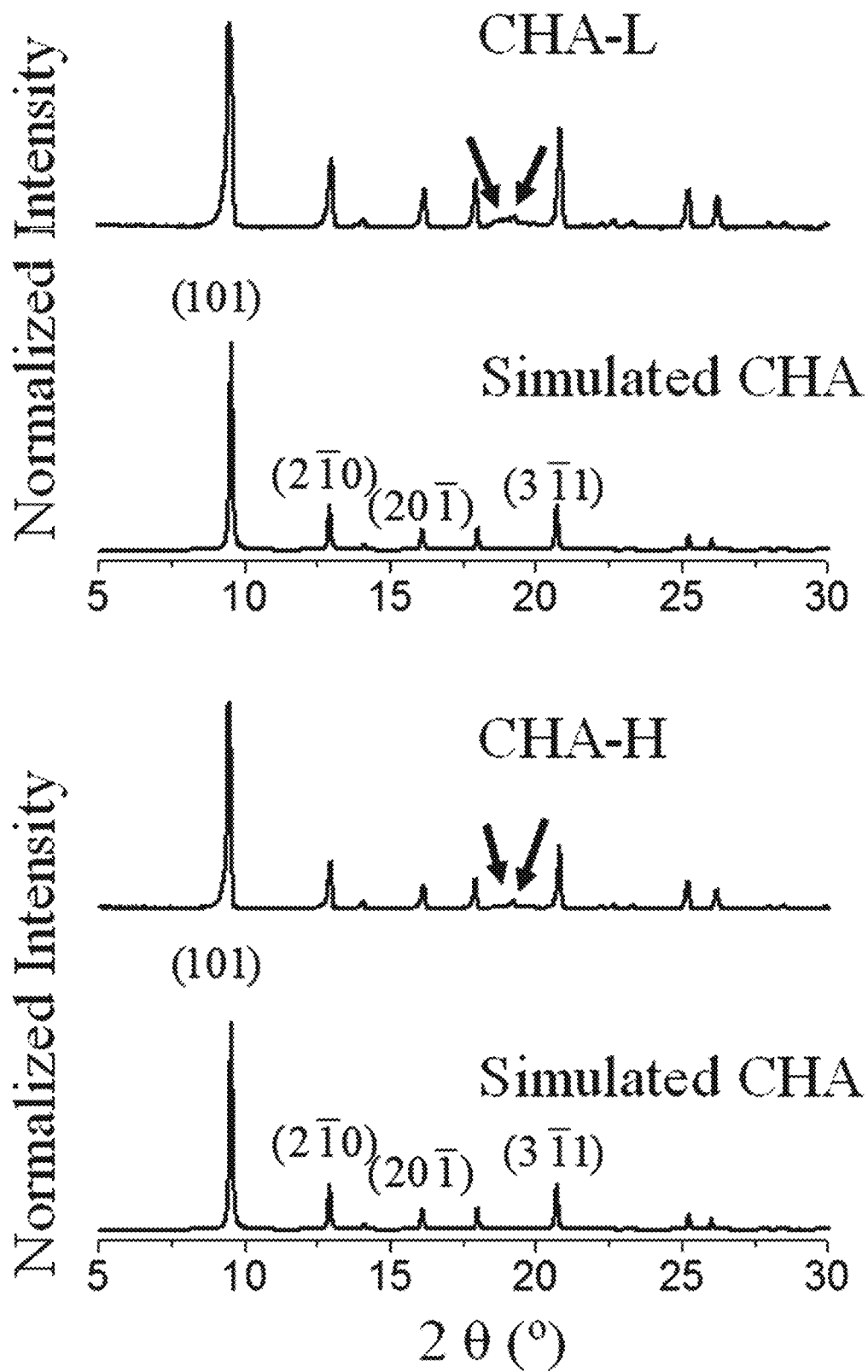
FIG. 5 shows XRD patterns of these particles.

FIG. 4 shows SEM images of CHA-L particles, prepared in Preparation Example 1, and CHA-H particles prepared in Preparation Example 2, and FIG. 5 shows XRD patterns of these particles.

As shown in FIG. 4, the CHA-L and CHA-H particles according to the present invention had the same cubic structure as conventional silica chabazite zeolite particles, and consisted of cubic CHA particles and plate-like CHA particles, which had a particle size distribution of 1-10 µm.

As shown in FIG. 5, the XRD patterns of the CHA-L and CHA-H particles according to the present invention were compared with the XRD patterns of the original CHA particles, and as a result, it was shown that the particles were the same, except that some amorphous phases were present in the CHA-L and CHA-H particles according to the present invention.

Figure 6:
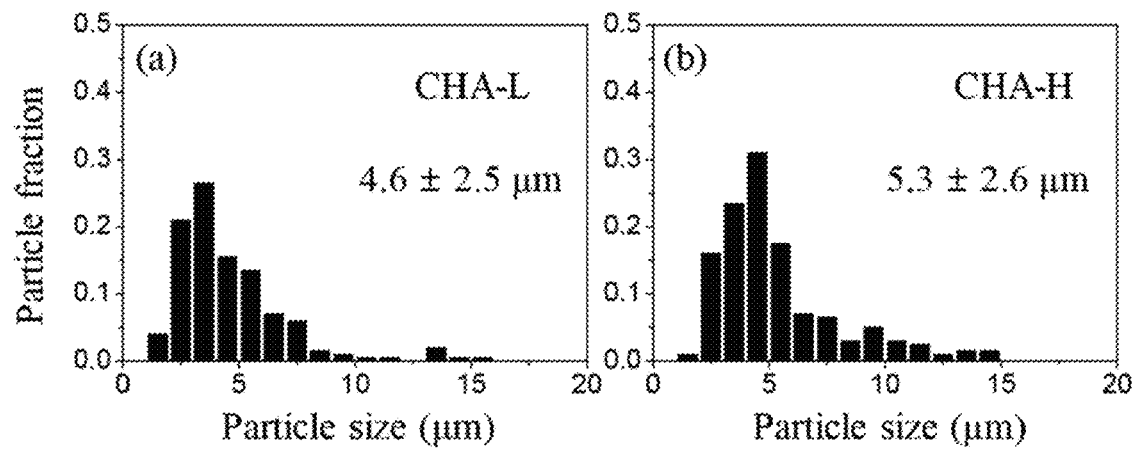
FIG. 6 is a graph showing particle size distributions measured from SEM images (FIG. 4) of CHA-L particles, prepared in Preparation Example 1, and CHA-H particles prepared in Preparation Example 2.

FIG. 6 is a graph showing particle size distributions measured from SEM images (FIG. 4) of CHA-L particles (a), prepared in Preparation Example 1, and CHA-H particles (b) prepared in Preparation Example 2. It can be seen from FIG. 6 that the average sizes of the CHA-L particles and the CHA-H particles are 4.6±2.5 μm and 5.3±2.6 μm, respectively.

Figure 7:
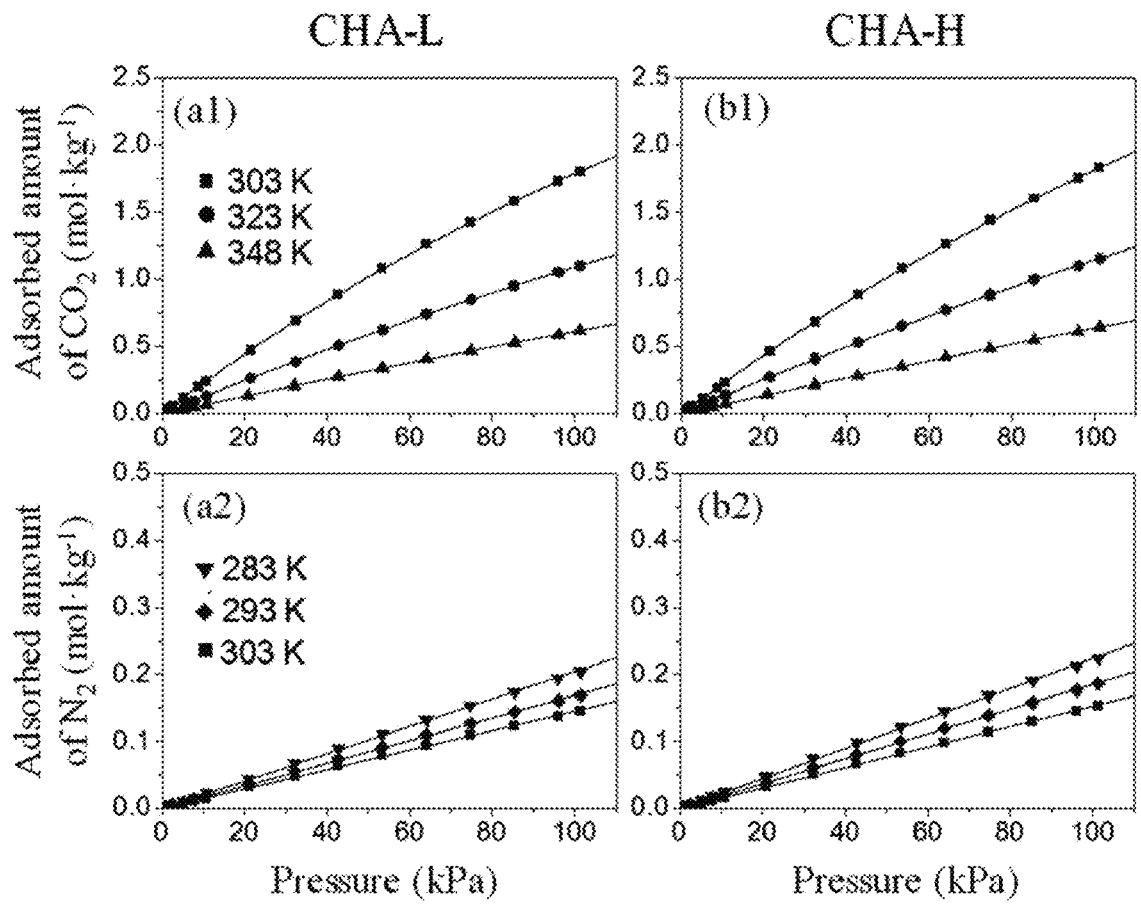
FIG. 7 depicts graphs showing $CO_2$ adsorption isotherms (graphs a1 and b1) and $N_2$ (graphs a2 and b2) adsorption isotherms of CHA-L particles of Preparation Example 1 and CHA-H particles of Preparation Example 2.

FIG. 7 depicts graphs showing $CO_2$ adsorption isotherms (graphs a1 and b1) and $N_2$ (graphs a2 and b2) adsorption isotherms of CHA-L particles of Preparation Example 1 and CHA-H particles of Preparation Example 2.

As shown in FIG. 7, the CHA-L particles, produced in Preparation Example 1, and the CHA-H particles produced in Preparation Example 2, were heated at a temperature of about 200° C. under a vacuum for 6 hours or more to thereby remove water, and then adsorption isotherms thereof were measured. The adsorption isotherms for $CO_2$ were measured at three different temperatures of 303K, 323K and 348K, and the adsorption isotherms for $N_2$ were measured at three different temperatures of 283K, 293K and 303K.

The $CO_2$ and $N_2$ adsorption isotherms were nearly identical between the CHA-L particles of Preparation Example 1 and the CHA-H particles of Preparation Example 2, indicating that these particles are structurally similar to each other.

Furthermore, the $CO_2$ and $N_2$ adsorption isotherms were fitted with Langmuir-type adsorption isotherms and the Henry's law, respectively, and the resulting fitted curves are shown in Table 1 below together with experimental data. Detailed information about the fitted parameters is summarized in Table 1 with a confidence interval of 95%. In addition, to obtain the heat of adsorption, the Langmuir parameter, predicted for $CO_2$, and the Henry's constant for $N_2$, were used.

As can be seen in Table 1 above, the CO2 adsorption isotherms of the CHA-L particles of Preparation Example 1 and the CHA-H particles of Preparation Example 2 indicated heat of adsorption of 25±1.9 kJ/mol and 24±6.2 kJ/mol, respectively, and the N2 adsorption isotherms indicated heat of adsorption of 12±7.1 kJ/mol and 14±5.0 kJ/mol, respectively. These values are well consistent with the experimental value (22.5 kJ/mol) and simulated value (23.0-23.6 kJ/mol) described in the literature [Fang, H. J.; Kamakoti, P.; Zang, J.; Cundy, S.; Paur, C.; Ravikovitch, P. I.; Sholl, D. S. J. Phys. Chem. C, 2012, 116 (19), 10692-10701].

The above results also indicate that the temperature of hydrothermal reaction has no effect on the intrinsic interaction between the silica chabazite framework and carbon dioxide. In view of the molar composition of flue gas from coal-fired power plants, $CO_2/N_2$ adsorption selectivity can be calculated using the following equation 3:

$$SS = \frac{\frac{n_{CO_2}}{P_{CO_2}}}{\frac{n_{N_2}}{P_{N_2}}}$$

wherein $n_i$ and $P_i$ are the absorbed amount and partial pressure of component, respectively. The final $CO_2/N_2$ adsorption selectivity was calculated at the partial pressures of CO2/N2 (for example, 13 kPa/77 kPa $CO_2/N_2$) present in flue gas.

TABLE 1

| Sample | Adsorbate | Temp.(K) | $q_{sat}$ (mol/kg) | b ($kPa^{-1}$) × $10^3$ | Heat of adsorption (kJ · $mol^{-1}$) |
|---|---|---|---|---|---|
| CHA-L (Preparation Example 1) | $CO_2$ | 303 | 7.3 ± 0.12 | 3.2 ± 0.06 | 25 ± 1.9 |
| | | 323 | | 1.8 ± 0.03 | |
| | | 348 | | 0.92 ± 0.02 | |
| CHA-L-CVD-48 (Example 1) | $CO_2$ | 303 | 7.6 ± 0.16 | 2.4 ± 0.07 | 23 ± 1.7 |
| | | 323 | | 1.4 ± 0.03 | |
| | | 348 | | 0.74 ± 0.02 | |
| CHA-H (Preparation Example 2) | $CO_2$ | 303 | 8.4 ± 0.17 | 2.8 ± 0.07 | 24 ± 6.2 |
| | | 323 | | 1.6 ± 0.04 | |
| | | 348 | | 0.83 ± 0.02 | |

| Sample | Adsorbate | Temp.(K) | K (mol · $kg^{-1}$ · $kPa^{-1}$) × $10^3$ | Heat of adsorption (kJ · $mol^{-1}$) |
|---|---|---|---|---|
| CHA-L (Preparation Example 1) | $N_2$ | 283 | 2.1 ± 0.01 | 12 ± 7.1 |
| | | 293 | 1.7 ± 0.01 | |
| | | 303 | 1.5 ± 0.01 | |
| CHA-H (Preparation Example 2) | $N_2$ | 283 | 2.2 ± 0.02 | 14 ± 5.0 |
| | | 293 | 1.9 ± 0.01 | |
| | | 303 | 1.5 ± 0.01 | |

The top of Table 1 above shows Langmuir adsorption constant and saturation performance for the $CO_2$ adsorption isotherms (shown in FIG. 7, in graphs a1 and b1) of the CHA-L particles of Preparation Example 1 and the CHA-H particles of Preparation Example 2. The values in Table 1 above are expressed with a confidence interval of 95%.

In addition, the bottom of Table 1 above shows estimated Henry's law constant for the $N_2$ adsorption isotherms (shown in FIG. 7, in graphs a2 and b2) of the CHA-L particles of Preparation Example 1 and the CHA-H particles of Preparation Example 2. The values in Table 1 above are expressed with a confidence interval of 95%.

According to equation 3 above, the $CO_2/N_2$ adsorption selectivity of the CHA-L particles produced in Preparation Example 1 was 16, 12 and 8.5 at 303K, 323K and 348K, respectively, and the $CO_2/N_2$ adsorption selectivity of the CHA-H particles produced in Preparation Example 2 was 15, 12 and 9.0 at 303K, 323K and 348K, respectively.

Herein, the highest adsorption selectivity of the CHA membrane produced using Preparation Example 1 or Preparation Example 2 was estimated to be 8, 6 and 4-5 at 303K, 323K and 348K, respectively, but this evaluation was based on the minimum penetration model.

The pore size of CHA particles is greater than the kinetic diameter of $N_2$, and thus it is difficult for the CHA particle to perfectly block $N_2$. To overcome this problem, a method of finely and simply controlling the pore size has been developed according to the present invention so that the $CO_2/N_2$ adsorption selectivity of the CHA membrane produced using CHA particles can further be increased.

Figure 8:
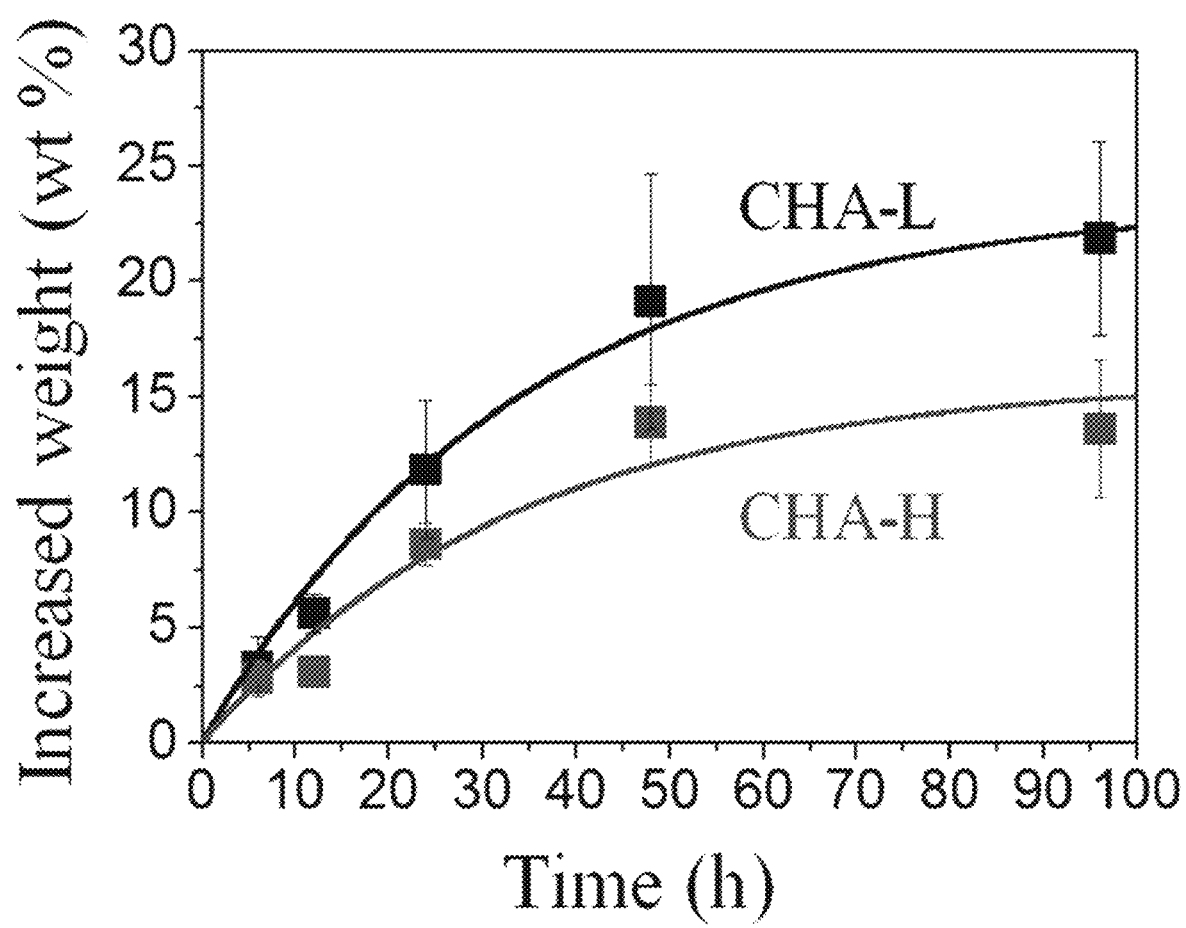
FIG. 8 shows the changes in weight of CHA-L-CVD particles, prepared in Example 1, and CHA-H-CVD particles prepared in Example 2, as a function of the time (6 to 96 hours) during which chemical vapor deposition is performed.

FIG. 8 shows the changes in weight of CHA-L-CVD particles prepared in Example 1, and CHA-H-CVD particles prepared in Example 2, as a function of the time (6 to 96 hours) during which chemical vapor deposition is performed.

As shown in FIG. 8, the weights of the CHA-L particles and the CHA-H particles increased by 23±4% and 16±3%, respectively, during the chemical vapor deposition process. This increase is associated with the surface area of the particles.

In addition, these results indicate that silica was deposited into the particles by chemical vapor deposition.

Figure 9:
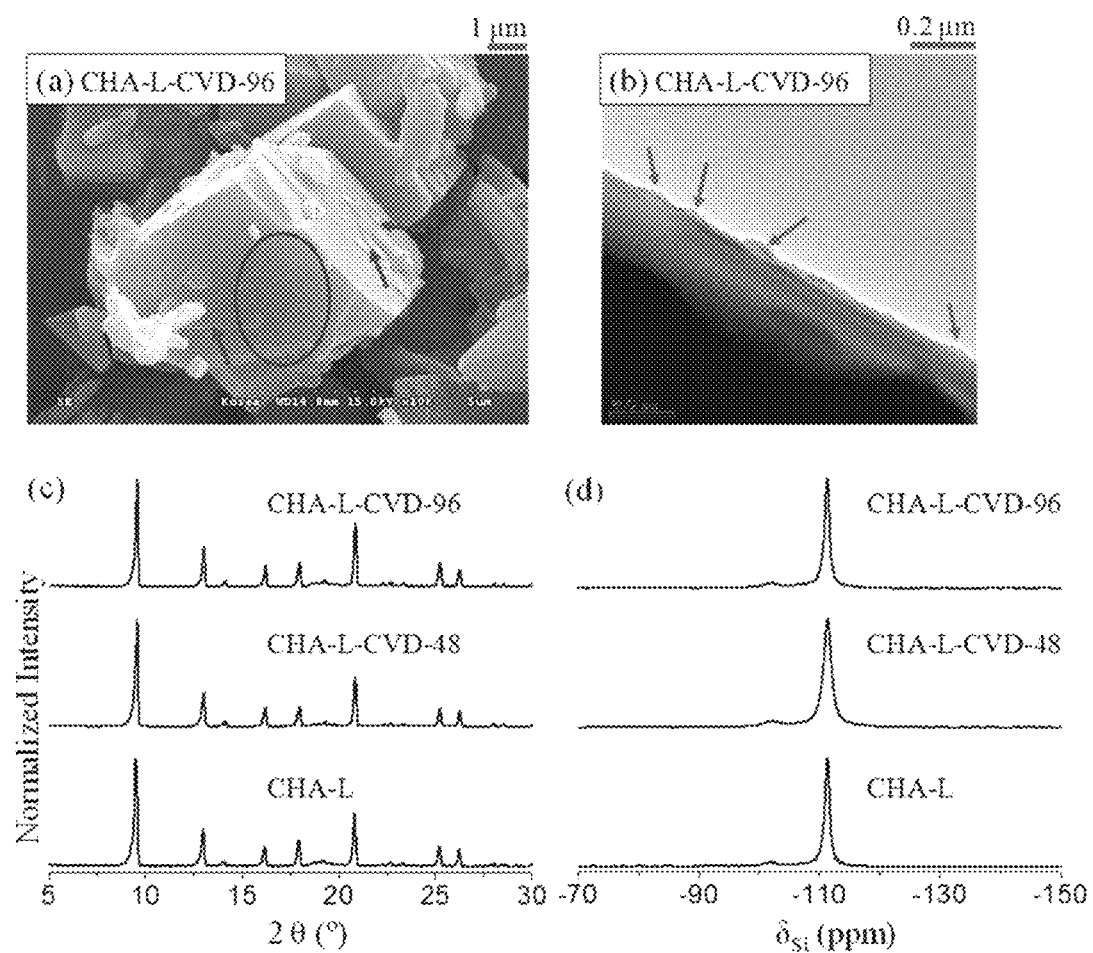
FIG. 9 shows SEM and TEM images and XRD patterns of CHA-L-CVD-48 and 96 particles prepared in Example 1.

FIG. 9 shows SEM and TEM images (a and b) and XRD patterns of CHA-L-CVD-48 and 96 particles prepared in Example 1. Herein, in FIG. 9, XRD patterns (c) are XRD patterns of CHA-L-CVD-48 and 96 particles prepared in Example 1 and CHA-L particles prepared in Preparation Example 1, and NMR graphs (d) are Si MAS NMR graphs of CHA-L-CVD-48 and 96 particles prepared in Example 1 and CHA-L particles prepared in Preparation Example 1.

As can be seen in FIG. 9, the surface of the CHA-L particles treated by chemical vapor deposition was rougher than the surface of the CHA-L particles of Preparation Example 1. The rough surface was imaged by TEM (FIG. 9, in image (b)), and as a result, it was shown that silica grains on the surface of the CHA-L-CVD-96 particles of Example 1 protruded in a convex shape (indicated by blue) by chemical vapor deposition. In addition, in a portion indicated by the arrow in image (a) of FIG. 9, it can be seen that plate-like CHA-L particles were also grown.

However, in the XRD patterns of the CHA-L-CVD-48 and CHA-L-CVD-96 particles prepared in Example 1 (FIG. 9, XRD patterns (c)), the presence of silica ($SiO2$) was not observed. In addition, in the Si MAS NMR graph (b) of FIG. 9, the presence of $SiO_2$ was not observed. The reason why the peak indicating the presence of $SiO2$ grown by CVD is because the peak was overpowered by a number of cubic CHA-L particles present adjacent thereto.

In order to increase the $CO_2/N_2$ separation factor of the chabazite zeolite membrane and to reduce the $CO_2$ permeation rate while reducing the cost, it is most effective to improve the structure of the membrane so as to reduce the pore mouth size to thereby inactivate $N_2$ diffusion. For this reason, in the present invention, the size of pore mouth or pore space of the chabazite zeolite membrane was finely controlled using chemical vapor deposition (Example 2). Thus, the $CO_2$ diffusion rate in the chabazite zeolite (CHA-L-CVD-x) membrane of Example 2 was compared with the $CO_2$ diffusion rate in the chabazite zeolite (CHA-L) of Comparative Example 1, which was not subjected to chemical vapor deposition.

Figure 10A:
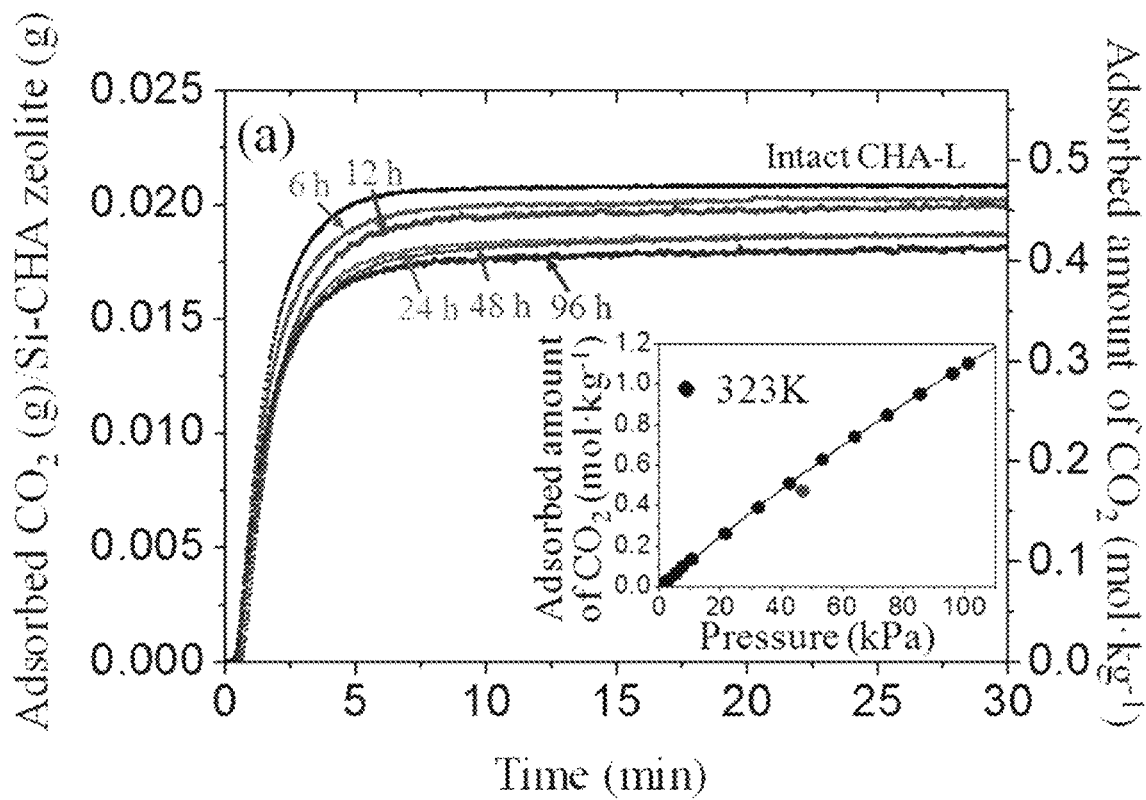
FIG. 10a is a TGA graph plotted to show $CO_2$ diffusion rates based on temporary changes in the weight of silica chabazite zeolite (CHA-L-CVD-x) (x=6, 12, 24, 28 and 96 hours) particles of Example 1 and intact silica chabazite zeolite (CHA-L) particles of Preparation Example 1 under a $CO_2$ partial pressure of ~47 kPa. The insert graph in FIG. 10a is an adsorption isotherm for $CO_2$ on CHA-L particles of Preparation Example 1 at 323K.

FIG. 10a is a TGA graph plotted to show $CO_2$ diffusion rates based on temporary changes in the weight of silica chabazite zeolite (CHA-L-CVD-x) (x=6, 12, 24, 28 and 96 hours) particles of Example 1 and intact silica chabazite zeolite (CHA-L) particles of Preparation Example 1 under a $CO_2$ partial pressure of ~47 kPa. The insert graph in FIG. 10a is an adsorption isotherm for $CO_2$ on CHA-L particles of Preparation Example 1 at 323K.

Figure 10B:
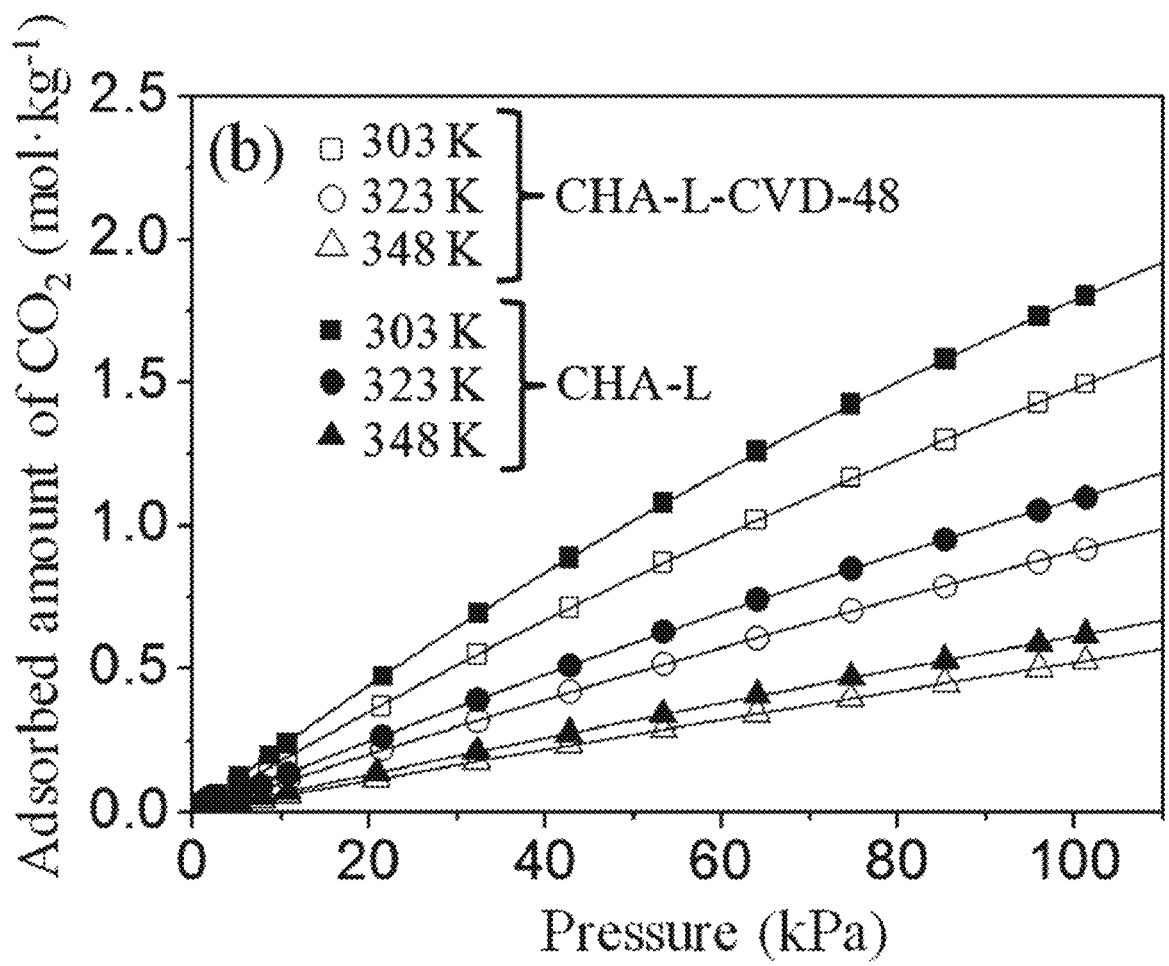
FIG. 10b depicts graphs showing $CO_2$ adsorption isotherms of CHA-L particles of Preparation Example 1 and CHA-L-CVD-48 particles of Example 1.

FIG. 10b depicts graphs showing $CO_2$ adsorption isotherms of CHA-L particles of Preparation Example 1 and CHA-L-CVD-48 particles of Example 1.

As can be seen in FIGS. 10a and 10b, the size of pore mouth of the CHA-L-CVD-x membrane produced in Example 1 was reduced by successful deposition of TEOS. Namely, it can be seen that the CHA-L-CVD-x particles produced in Example 1 showed a decrease in saturation capacity of about 10% compared to the CHA-L particles produced in Preparation Example 1.

Figure 11:
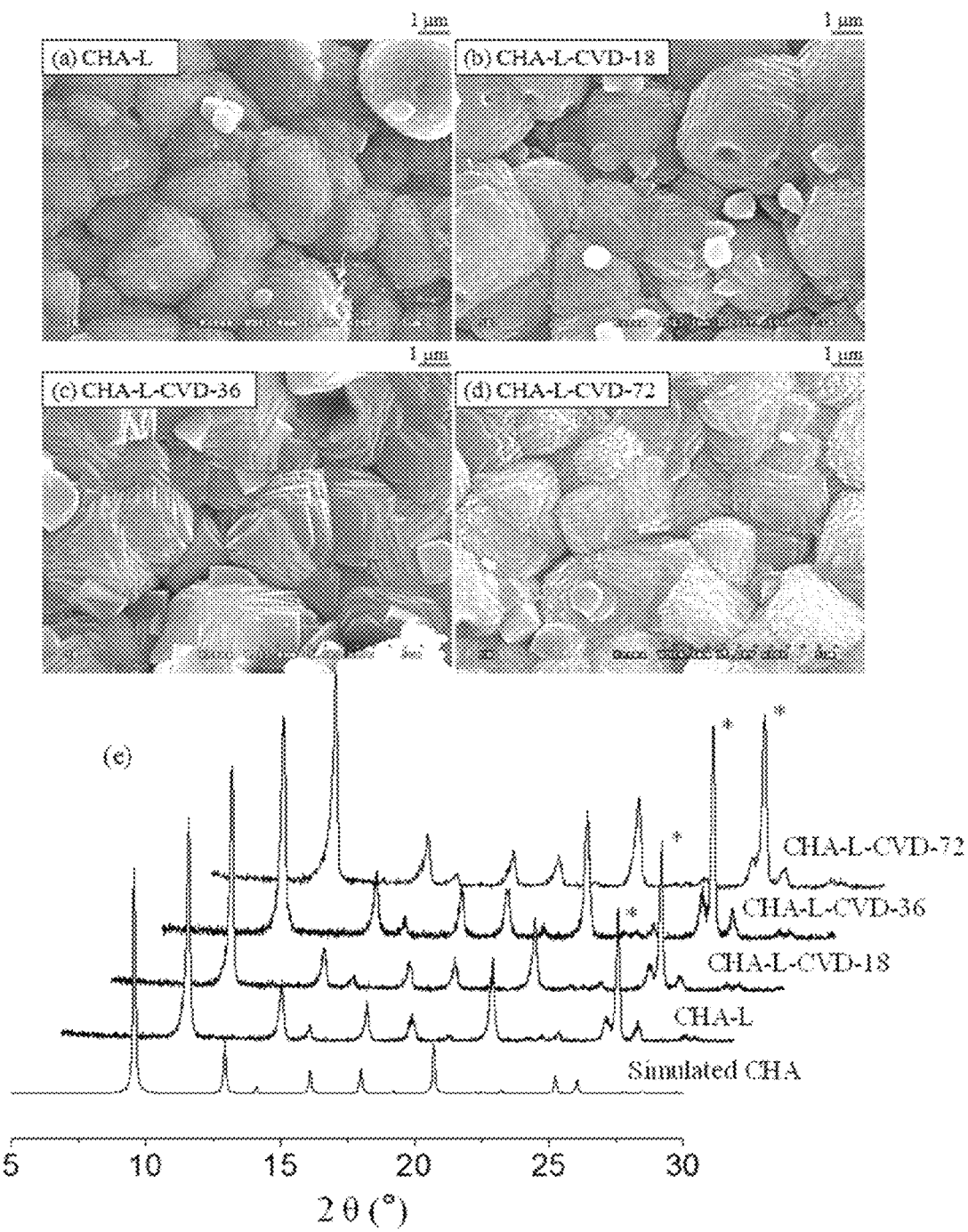
FIG. 11 shows SEM images of a CHA-L membrane (a) produced in Comparative Example 1, and a CHA-L-CVD-18 membrane (b), a CHA-L-CVD-36 membrane (c) and a CHA-L-CVD-72 membrane (d), which are produced in Example 2.

FIG. 11 shows SEM images of a CHA-L membrane (a) produced in Comparative Example 1, and a CHA-L-CVD-18 membrane (b), a CHA-L-CVD-36 membrane (c) and a CHA-L-CVD-72 membrane (d), which are produced in Example 2.

FIG. 11 shows XRD patterns (e) of a CHA-L membrane produced in Comparative Example 1, and a CHA-L-CVD-18 membrane, a CHA-L-CVD-36 membrane and a CHA-L-CVD-72 membrane, which are produced in Example 2. In XRD patterns (e), the peaks indicated by the symbol * indicate an $\alpha$-$Al_2O_3$ disc.

As can be seen in FIG. 11, the CHA-L membrane (a) was successfully produced from the uniform seed layer, and as can be seen in images (b) through (d), only the pore sizes of the CHA-L-CVD-18, CHA-L-CVD-36 and CHA-L-CVD-72 membranes were controlled through chemical vapor deposition without causing a remarkable change in the surface.

A slight amount of silica deposited by chemical vapor deposition was not found from the XRD patterns (e) of FIG. 11.

Figure 12:
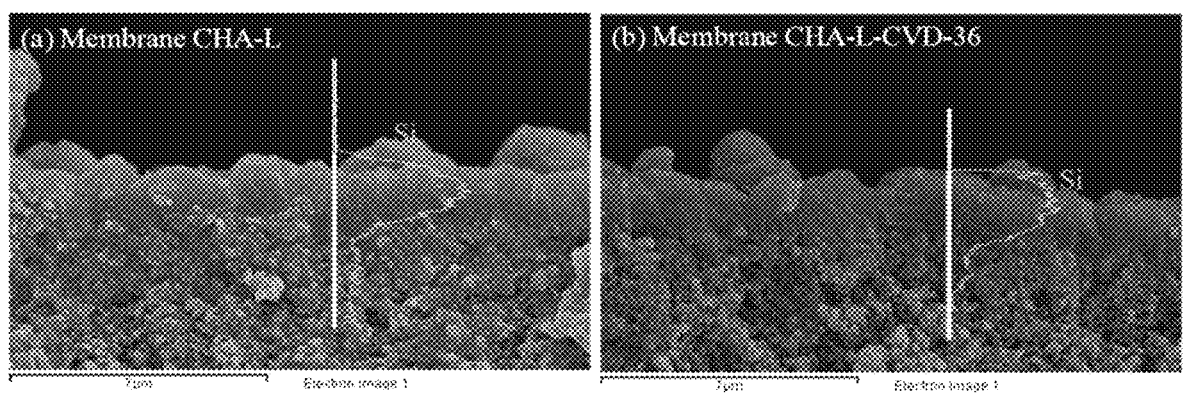
FIG. 12 shows SEM images of the cross-sections of a CHA-L membrane (a) produced in Comparative Example 1 and a CHA-L-CVD-36 membrane (b) produced in Example 2. In addition, the results of energy dispersive X-ray analysis of these membranes are shown in the images.

FIG. 12 shows SEM images of the cross-sections of a CHA-L membrane (a) produced in Comparative Example 1 and a CHA-L-CVD-36 membrane (b) produced in Example 2. In addition, the results of energy dispersive X-ray analysis of these membranes are shown in the images.

It can be seen from FIG. 12 that the CHA-L membrane and the CHA-L-CVD-36 membrane have a thickness of about 2 μm.

Figure 13:
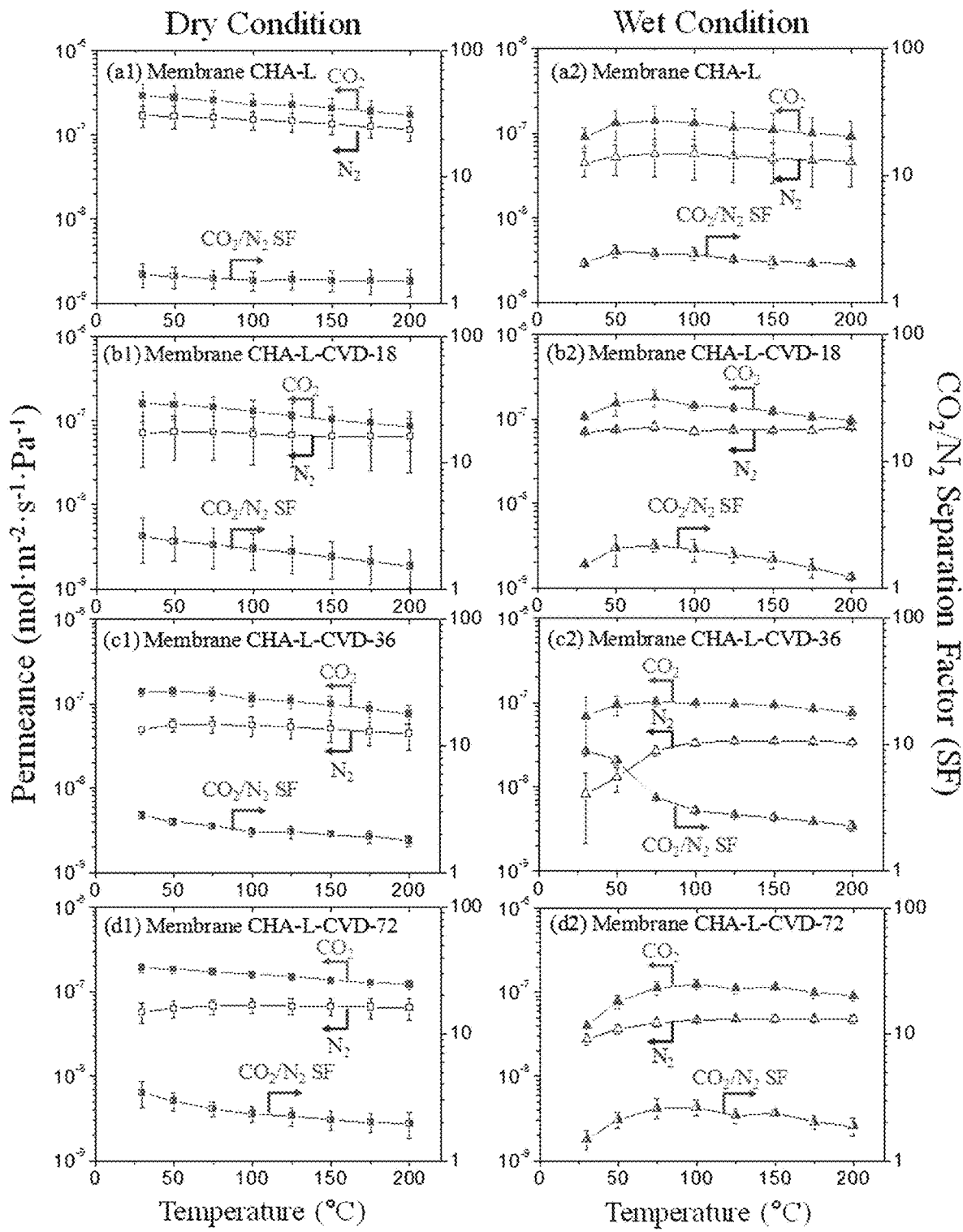
FIG. 13 depicts graphs showing the $CO_2/N_2$ separation properties of a CHA-L membrane (graphs a1 and a2) produced in Comparative Example 1, and a CHA-L-CVD-18 membrane (graphs b1 and b2), a CHA-L-CVD-36 membrane (graphs c1 and c2) and a CHA-L-CVD-72 membrane (graphs d1 and d2), which are produced in Example 2, as a function of temperature.

FIG. 13 depicts graphs showing the $CO_2/N_2$ separation properties of a CHA-L membrane (graphs a1 and a2) produced in Comparative Example 1, and a CHA-L-CVD-18 membrane (graphs b1 and b2), a CHA-L-CVD-36 membrane (graphs c1 and c2) and a CHA-L-CVD-72 membrane (graphs d1 and d2), which are produced in Example 2, as a function of temperature. In FIG. 13, the left graphs show the results measured under a dry condition, and the right graphs shows the results measured under a wet condition.

As shown in FIG. 13, the $CO_2/N_2$ separation factor of the CHA-L membrane produced in Comparative Example 1 was measured to be about 1.7±0.4, which is much lower than an expected $CO_2/N_2$ separation factor of 8 at the same temperature. This difference between the theoretical value and the measured value is believed to be due to defects present in zeolite.

When the chemical vapor deposition was performed for 18, 36 and 72 hours, the $CO_2/N_2$ separation factor of the CHA-L membrane increased to 2.6±1.0, 2.8±0.2 and 3.4±0.8, respectively. Namely, it can be seen that the chemical vapor deposition increased the $CO_2/N_2$ separation factor by up to about 2 times.

In the case of the CHA-L membrane (a1 and a2) and the CHA-L-CVD-18 membrane (b1 and b2), no visible change was observed, but in the case of the CHA-L-CVD-36 membrane (c1 and c2) and the CHA-L-CVD-72 membrane (d1 and d2), it was observed that the $CO_2/N_2$ separation factor increased at 100° C. or lower and the $CO2$ and $N2$ permeances decreased. This is believed to be because of interference caused by water molecules physically adsorbed into the membrane.

It can be seen that, due to the presence of the water molecules, $N_2$ receives more resistance than $CO_2$. The maximum $CO_2/N_2$ separation factor of the CHA-L-CVD-36 membrane (c1 and c2) was 8.8 under a wet condition and 2.8 under a dry condition, which were significantly higher than those of other membranes.

It appears that, as the temperature increases, the absorption of water into the membrane decreases so that the membrane is less interfered with by water, and thus the $N_2$ permeance through the membrane increases, resulting in a decrease in the maximum $CO_2/N_2$ separation factor.

Accordingly, it is important to form silica on the surface of the CHA-L membrane of the present invention to thereby reduce the hydrophilicity of the membrane.

The temperature of most flue gases from post-treatment processes is in the range of 50 to 75° C., and thus the $CO_2/N_2$ separation factor of the CHA-L-CVD-36 membrane at that temperature is 7.5±0.6. This separation factor value is higher than an expected value of 6 under a dry condition, and is 3-fold higher than the $CO_2/N_2$ separation factor of the CHA-L membrane of Comparative Example 1 in the temperature range.

In the case of the CHA-L-CVD-72 membrane, the $N_2$ permeance increased and the $CO_2/N_2$ separation factor decreased to 2.7±0.4 (100° C.). This is because the surface of the CHA-L-CVD-72 membrane is more hydrophobic and the adsorption of water by the surface is low so that $N_2$ permeation is less interfered with by $H_2O$.

Figure 14:
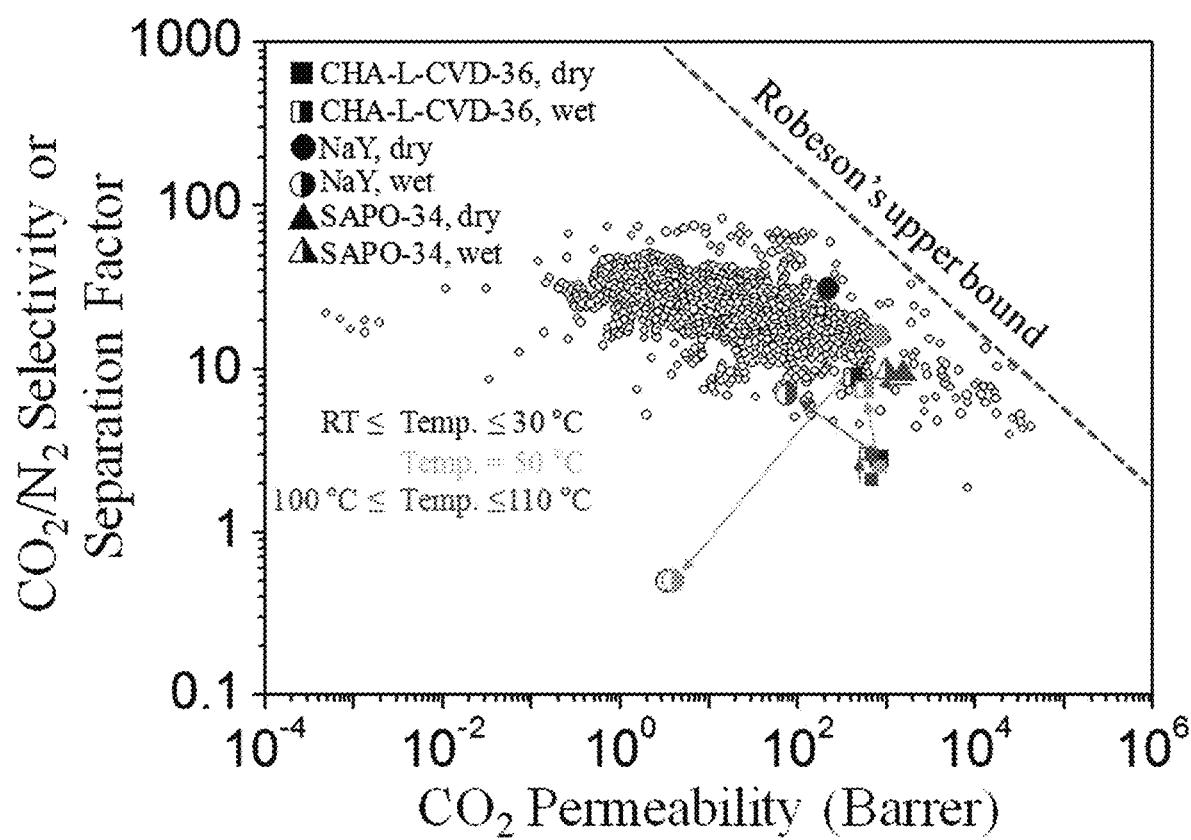
FIG. 14 is a graph comparing the $CO_2/N_2$ separation factor and the $CO_2$ permeability between a CHA-L-CVD-36 membrane produced in Example 2 and a conventional NaY membrane and SAPO-34 membrane.

FIG. 14 is a graph comparing the $CO_2/N_2$ separation factor and the $CO_2$ permeability between a CHA-L-CVD-36 membrane produced in Example 2 and a conventional NaY membrane and SAPO-34 membrane. The numerical values of the comparison results of FIG. 14 were listed in Table 2 below.

of the present invention, but the $CO_2$ permeability or the $CO_2/N_2$ separation coefficient decreased rapidly under a wet condition. This is because the NaY zeolite has high hydrophilicity at low temperature. At high temperature, the ability of the NaY zeolite to adsorb $H_2O$ decreased, but $H_2O$ still reduced the $CO_2$ permeability and CO2/N2 separation factor of the NaY zeolite.

When a small amount of $H_2O$ was introduced (under the conditions of about 0.1 kPa and 50° C.), the $CO_2$ adsorption of conventional NaX (FAU) [Y. Wang, M. D. Levan, J. Chem. Eng. Data, 2009, 54, 2839-2844] and zeolite 5A (LTA) [Y. Wang, M. D. Levan, J. Chem. Eng. Data, 2010, 55, 3189-3195.] at 50° C. was significantly decreased (about 10-fold decrease).

Conventional SAPO-34 has an excellent $CO_2/N_2$ separation coefficient and high $CO_2$ permeability, but can be used only at high temperature and has low $CO_2$ permeance.

In conclusion, it can be seen that the CHA-L-CVD-36 membrane obtained using chemical vapor deposition according to the present invention can maintain an excellent $CO_2/N_2$ separation factor and $CO_2$ permeance even under various environmental conditions such as a dry condition and a wet condition.

In general, as the separation factor increases in membrane gas separation, the permeance decreases due to a reduction in the pore size. It can be seen that both the separation factor and permeance of the CHA-L-CVD-x membrane according to the present invention increase, suggesting that both the pore size and pore size distribution of the membrane were controlled.

INDUSTRIAL APPLICABILITY

The chabazite zeolite membrane with a controlled pore size according to the present invention can remove defects

TABLE 2

| Membrane (Si/Al)/support (pore size) | Feed conc. (kPa) | Temp. (° C.) | $CO_2/N_2$ Separation factor | $CO_2$ permeance$10^7$ (mol·m$^{-2}$·s$^{-1}$·Pa$^{-1}$) | $CO_2$ permeability (barrer) | Orientation | Thickness (μm) |
|---|---|---|---|---|---|---|---|
| NaY(1.7-1.8)/Al$_2$O$_3$ Disc (~100 nm) | 43/43 | 25 | 31 | 0.21 | 220 | r | ~3-4 |
| | | 50 | 16 | 0.78 | 820 | | |
| | | 110 | 3 | 0.62 | 650 | | |
| | 41.7/41.7/2.64 | 25 | 0.5 | 0.0032 | 3.4 | | |
| | | 50 | 0.55 | 0.0037 | 3.9 | | |
| | | 110 | 7 | 0.0091 | 9.5 | | |
| SAPO-34 (N/A)/stainless steel tubes (~270 nm) | 15.3/86.7 | 105 | 9.4 | 1.0 | 1540 | r | ~5 |
| | 14.3/79.6/8.2 | 105 | 9.8 | 0.66 | 990 | | |
| CHA(~20/—Al$_2$O$_3$ Disc (~15-200 nm): CHA-L-CVD-36 | 50/50 | 30 | 2.8 | 1.4 | 820$^a$ | r | ~2 |
| | | 50 | 2.5 | 1.4 | 840 | | |
| | | 100 | 2.1 | 1.3 | 680 | | |
| | 48.5/48.5/3 | 30 | 8.8 | 0.70 | 420 | | |
| | | 50 | 7.5 | 0.95 | 570 | | |
| | | 100 | 3.8 | 1.0 | 590 | | |

To calculate the permeance from the permeability, membranes having a thickness of 2 μm were used.

The conventional NaY and SAPO-34 membranes are those produced by growth from the uniform seed layer in the same manner as described in Comparative Example 1.

As shown in FIG. 14 and Table 2 above, the NaY membrane showed excellent separation performance under a dry condition, even though the separation performance was lower than Robeson's upper bound.

Although the $CO_2$ permeability or $CO_2/N_2$ separation factor of the conventional membranes (NaY and SAPO-34) would be higher than that of the CHA-L-CVD-36 membrane from a chabazite zeolite membrane and effectively control the pore size of the membrane by the application of chemical vapor deposition, thereby improving $CO_2/N_2$ separation performance.

In particular, unlike hydrophilic membranes showing excellent $CO_2/N_2$ separation performance under a dry condition, the chabazite zeolite membrane with a controlled pore size according to the present invention has a hydrophobic surface, and thus can maintain excellent $CO_2/N_2$ separation performance even under a wet condition. Accordingly, the chabazite zeolite membrane of the present invention can effectively capture carbon dioxide from nitrogen under various environmental conditions.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of preparing a chabazite zeolite membrane having a controlled pore size using a chemical vapor deposition, comprising:
   (I) depositing plate-like silica chabazite zeolite particles onto a substrate or a support by sonicating the substrate or the support and a suspension of silica chabazite zeolite particles, thereby forming a uniform seed layer;
   (II) producing a chabazite zeolite membrane by hydrothermally treating the substrate or the support having the uniform seed layer to grow the uniform seed layer; and
   (III) treating chemical vapor deposition (CVD) on the chabazite zeolite membrane while introducing silica precursor having a vapor-phase onto surface of the chabazite zeolite membrane,
   wherein the method comprises at least one of (a) and (b):
   (a) before (III), a step of preheating the chabazite zeolite membrane, produced in step (II), at a temperature of 450 to 550° C. for 0.5-2 hours; and
   (b) a step of calcining the chabazite zeolite membrane having a controlled pore size produced in the step (III), at a temperature of 500 to 550° C. with a ramp rate of 0.1-10° C./min under an air flow of 150-250 ml/min.

2. The method of preparing a chabazite zeolite membrane having a controlled pore size of claim 1, wherein the silica chabazite zeolite particles are prepared by hydrothermally treating a silica chabazite zeolite precursor solution comprising a silica precursor, hydrofluoric acid, a templating agent and water.

3. The method of preparing a chabazite zeolite membrane having a controlled pore size of claim 2, wherein the silica chabazite zeolite precursor solution is prepared by a method comprising:
   mixing TMAdaOH (N,N,N-trimethyl-1-adamantanammonium hydroxide), ethanol, deionized water and tetraethyl orthosilicate (TEOS);
   preparing a powder by heating a mixture; and
   crushing the powder and adding hydrofluoric acid dropwise thereto.

4. The method of preparing a chabazite zeolite membrane having a controlled pore size of claim 3, wherein the heating is performed at a temperature of 150 to 200° C. for 12-240 hours.

5. The method of preparing a chabazite zeolite membrane having a controlled pore size of claim 1, further comprising, before forming the uniform seed layer in the (I), calcining the silica chabazite zeolite particles at a temperature of 500 to 700° C. with a ramp rate of 0.1-10° C./min for 2-72 hours under an air or oxygen flow of 100-500 cc/min.

6. The method of preparing a chabazite zeolite membrane having a controlled pore size of claim 1, wherein the substrate or the support is made of one or more selected from the group consisting of silicon, glass, alumina, zirconia, titania, ceria and vanadia.

7. The method of preparing a chabazite zeolite membrane having a controlled pore size of claim 1, wherein the silica chabazite zeolite particles after the (I) satisfies following equations 1 and 2:

$$0.01 \leq \frac{z}{x} \leq 0.5 \quad \text{[Equation 1]}$$

$$0.1 \leq \frac{x}{y} \leq 10 \quad \text{[Equation 2]}$$

wherein x is average length of particles, y is average width of particles, and z is average height of particles.

8. The method of preparing a chabazite zeolite membrane having a controlled pore size of claim 1, wherein hydrothermal treatment is performed at a temperature of 100 to 200° C. for at least 24 hours.

9. The method of preparing a chabazite zeolite membrane having a controlled pore size of claim 1, wherein hydrothermal treatment is performed using a solution comprising 100 $SiO2$: 1-100 $Na_2O$: 0.1-10 $Al_2O_3$: 20 TMAdaOH: 1000-40000 $H_2O$ (molar ratio).

10. The method of preparing a chabazite zeolite membrane having a controlled pore size of claim 1, further comprising, after hydrothermal treatment, calcining the chabazite zeolite membrane at a temperature of 500 to 700° C. with a ramp rate of 0.1-10° C./min for 2-72 hours under an air or oxygen flow of 100-500 cc/min.

11. The method of preparing a chabazite zeolite membrane having a controlled pore size of claim 2, wherein the silica precursor is one or more selected from the group consisting of silane, dimethylsilane, trimethylsilane, tetramethylsilane, diethylsilane, tetramethyl orthosilicate (TMOS), tetraethyl orthosilicate (TEOS), octamethyltrisiloxane (OMTS), octamethylcyclotetrasiloxane (OMCTS), tetramethyldimethyldimethoxydisilane, tetramethylcyclotetrasiloxane (TOMCATS), dimethyldimethoxysilane (DMDMOS), diethoxymethylsilane (DEMS), methyltriethoxysilane (MTES), phenyldimethylsilane, and phenylsilane.

12. The method of preparing a chabazite zeolite membrane having a controlled pore size of claim 1, wherein the chabazite zeolite membrane produced in the (II) has a Si/Al molar ratio of 5-1,000.

13. The method of preparing a chabazite zeolite membrane having a controlled pore size of claim 1, comprising, before the (III), a step of preheating the chabazite zeolite membrane, produced in step (II), at a temperature of 450 to 550° C. for 0.5-2 hours.

14. The method of preparing a chabazite zeolite membrane having a controlled pore size of claim 1, wherein the chemical vapor deposition (CVD) is performed at a temperature of 50 to 500° C. for 6-144 hours.

15. The method of preparing a chabazite zeolite membrane having a controlled pore size of claim 1, comprising a step of calcining the chabazite zeolite membrane having a controlled pore size produced in the (III), at a temperature of 500 to 550° C. with a ramp rate of 0.1-10° C./min under an air flow of 150-250 ml/min.

16. The method of preparing a chabazite zeolite membrane having a controlled pore size of claim 1, wherein size of one or more defects present in the chabazite zeolite membrane produced in the (III) is controlled.

* * * * *